United States Patent [19]

Ogino et al.

[11] Patent Number: 4,923,285

[45] Date of Patent: May 8, 1990

[54] DRIVE APPARATUS HAVING A TEMPERATURE DETECTOR

[75] Inventors: Yoshitaka Ogino; Shinjiro Okada, both of Kawasaki; Yutaka Inoue, Urawa, all of Japan

[73] Assignee: Canon Kabushiki Kaisha, Tokyo, Japan

[21] Appl. No.: 287,657

[22] Filed: Dec. 21, 1988

Related U.S. Application Data

[63] Continuation of Ser. No. 853,166, Apr. 17, 1986, abandoned.

[30] Foreign Application Priority Data

Apr. 22, 1985 [JP] Japan .................................. 60-86678
Apr. 23, 1985 [JP] Japan .................................. 60-87085

[51] Int. Cl.$^5$ .............................................. G02F 1/13
[52] U.S. Cl. .............................. 350/331 T; 350/350 S; 340/713
[58] Field of Search ................. 350/350 S, 332, 331 T; 340/713

[56] References Cited

U.S. PATENT DOCUMENTS

| | | | |
|---|---|---|---|
| 3,921,162 | 11/1975 | Fukai et al. ......................... | 340/713 |
| 4,045,791 | 8/1977 | Fukai et al. ......................... | 340/713 |
| 4,317,115 | 2/1982 | Kawakami et al. ................. | 340/805 |
| 4,367,924 | 1/1983 | Clark et al. ......................... | 350/334 |
| 4,556,876 | 12/1985 | Shimizu et al. ..................... | 340/805 |
| 4,556,877 | 12/1985 | Kumagai et al. .................... | 340/805 |
| 4,576,732 | 3/1986 | Isogeri et al. ....................... | 350/350 S |
| 4,621,261 | 11/1986 | Hehlen et al. ....................... | 340/805 |
| 4,655,561 | 4/1987 | Kanbe et al. ....................... | 350/350 S |
| 4,715,688 | 12/1987 | Harada et al. ...................... | 350/350 S |
| 4,769,639 | 9/1988 | Kawamura et al. ................. | 350/332 |

OTHER PUBLICATIONS

Odawara et al., "An 80-Character Alphanumeric Liquid Crystal Display System for computer Terminals", Proceedings of the SID, vol. 21, e, 1980.

Primary Examiner—Andrew J. James
Assistant Examiner—Huy K. Mai
Attorney, Agent, or Firm—Fitzpatrick, Cella, Harper & Scinto

[57] ABSTRACT

A drive apparatus has a ferroelectric LCD for displaying information, a thermo detector for detecting the temperature of the LCD, a driver for driving the LCD by a drive signal having a pulse width corresponding to an output from the thermo detector, and a computer for controlling the driver. When a plurality of display elements are to be driven, they can be divided into blocks and controlled in accordance with an average temperature of each block.

19 Claims, 26 Drawing Sheets

```
          0
SEQUENCE
PROGRAM
          7FF
          800
ΔT TIMER CODE
          BFF
          C00
CHARACTER CODE
          FFF
```

| BIT | ABBREVIATED NAME | CONTENTS OF FLAG |
|---|---|---|
| 0 | ADEF | INITIAL An0-An7 A/D CONVERSION END FLAG |
| 1 | WRF | WRITE-IN FLAG SET UPON PRESET CONDITION |
| 2 | CLF | DISPLAY CLEAR FLAG SET UPON PRESET CONDITION |
| 3 | | |
| 4 | | |
| 5 | | |
| 6 | | |
| 7 | | |

ADDRESS 0

FIG.4C

| ADDRESS | ABBREVIATED NAME | CONTENTS |
|---------|------------------|----------|
| 1 | ADR0 | STORE RESULT OF A/D CONVERSION OF INPUT An0 |
| 2 | ADR1 | STORE RESULT OF A/D CONVERSION OF INPUT An1 |
| 3 | ADR2 | STORE RESULT OF A/D CONVERSION OF INPUT An2 |
| 4 | ADR3 | STORE RESULT OF A/D CONVERSION OF INPUT An3 |
| 5 | ADR4 | STORE RESULT OF A/D CONVERSION OF INPUT An4 |
| 6 | ADR5 | STORE RESULT OF A/D CONVERSION OF INPUT An5 |
| 7 | ADR6 | STORE RESULT OF A/D CONVERSION OF INPUT An6 |
| 8 | ADR7 | STORE RESULT OF A/D CONVERSION OF INPUT An7 |
| 9·A | $\Delta T$ | FERROELECTRIC LC WRITING ORIGINAL OSC TIMER DATA |
| B | CROW | ROW COUNTER (1-32) FOR ONE CHARACTER |
| C | PD | An0~An7 AVERAGE TEMPERATURE DATA |
| D | ACD | FERROELECTRIC LC MATRIX COLUMN ADDRESS DATA |
| E·F | ARD | FERROELECTRIC LC MATRIX ROW ADDRESS DATA |

FIG.9A

| ADDRESS | ABBREVIATED NAME | CONTENTS |
|---------|------------------|----------|
| 1 | ADR0 | STORE RESULT OF A/D CONVERSION OF INPUT An0 |
| 2 | ADR1 | STORE RESULT OF A/D CONVERSION OF INPUT An1 |
| 3 | ADR2 | STORE RESULT OF A/D CONVERSION OF INPUT An2 |
| 4 | ADR3 | STORE RESULT OF A/D CONVERSION OF INPUT An3 |
| 5 | ADR4 | STORE RESULT OF A/D CONVERSION OF INPUT An4 |
| 6 | ADR5 | STORE RESULT OF A/D CONVERSION OF INPUT An5 |
| 7 | ADR6 | STORE RESULT OF A/D CONVERSION OF INPUT An6 |
| 8 | ADR7 | STORE RESULT OF A/D CONVERSION OF INPUT An7 |
| 9·A | $\Delta T$ | FERROELECTRIC LC WRITING ORIGINAL OSC TIMER DATA |
| B | CROW | ROW COUNTER (1-7) FOR ONE CHARACTER |
| C | BPD1 | An0, An6 & An7 AVERAGE TEMP. DATA |
| D | BPD2 | An4, An5 & An6 AVERAGE TEMP. DATA |
| E | BPD3 | An0, An1 & An2 AVERAGE TEMP. DATA |
| F | BPD4 | An2, An3 & An4 AVERAGE TEMP. DATA |
| 10 | ACD | FERROELECTRIC LC MATRIX COLUMN ADDRESS DATA |
| 11·12 | ARD | FERROELECTRIC LC MATRIX ROW ADDRESS DATA |

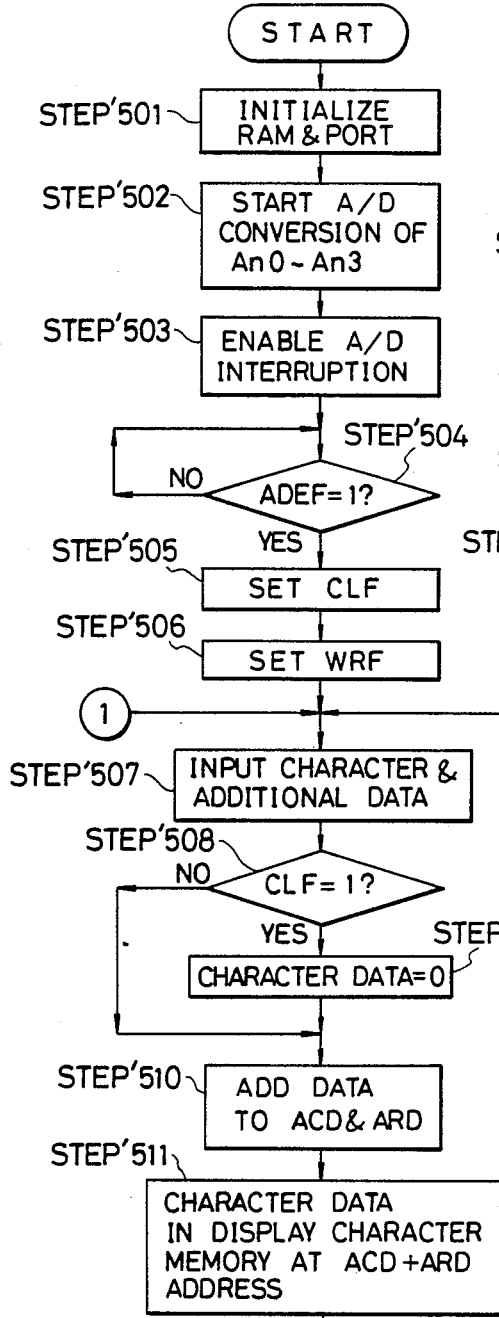
FIG.10Aa
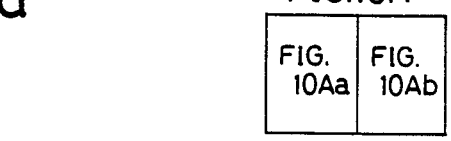

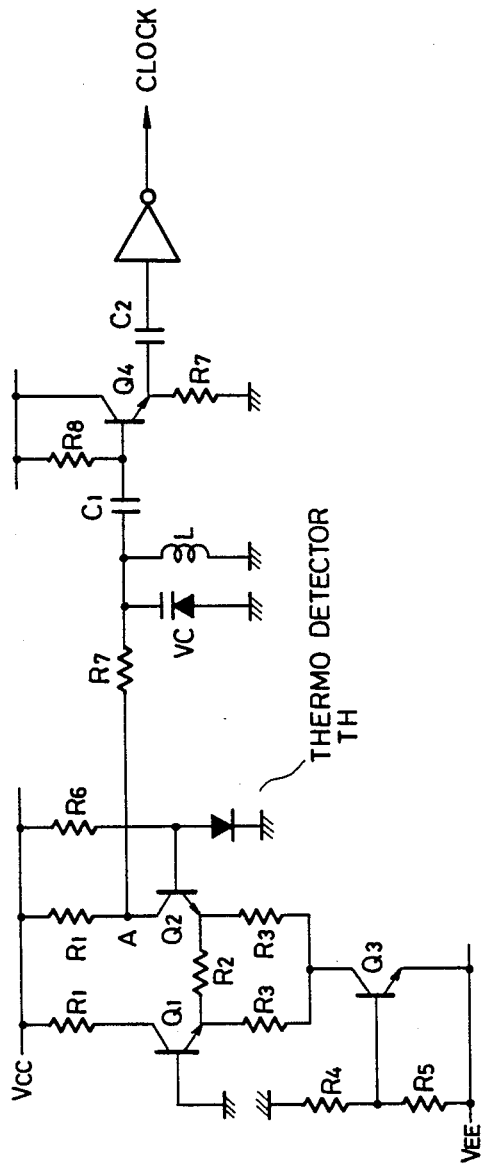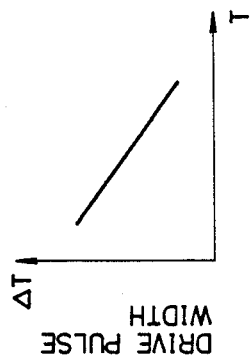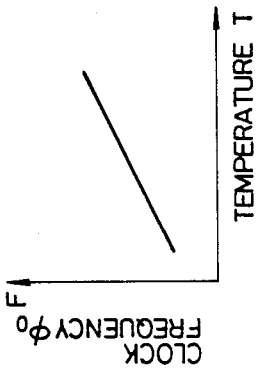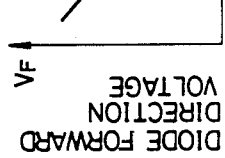

DRIVE APPARATUS HAVING A TEMPERATURE DETECTOR

This application is a continuation of application Ser. No. 853,166 filed Apr. 17, 1986, now abandoned.

BACKGROUND OF THE INVENTION

1. Field of the Invention

The present invention relates to a display drive apparatus and, more particlarly, to a drive apparatus for driving a display element which has a threshold value with a high temperature dependency.

2. Related Background Art

Along with various developments in related techniques, the operation temperature ranges of LCD devices using nematic liquid crystals, such as twisted nematic LCD devices, DSM LCD devices, or cholesteric-nematic phase transition-type guest-host LCD devices have recently become wider and have solved the problem of temperature compensation to a certain extent.

With the case of ferrodielectric LCD devices, however, the threshold value has a large dependency on temperature, as shown in FIG. 2.

When a ferroelectric LCD device having such (temperature) characteristics is driven, the cell temperature has been conventionally controlled. This results in a large apparatus and high power consumption.

SUMMARY OF THE INVENTION

It is an object of the present invention to eliminate the drawbacks of the prior art techniques.

It is another object of the present invention to improve a drive apparatus.

It is still another object of the present invention to provide a drive apparatus which can appropriately drive a display element having temperature dependency.

It is still another object of the present invention to provide a drive apparatus which does not require special equipment such as a temperature controller.

It is still another object of the present invention to provide a drive apparatus which controls the display operation of a display element in accordance with the temperature of the display element which has temperature dependency.

It is still another object of the present invention to provide a drive apparatus which controls the display operation of a display element in accordance with the average temperature of the display element.

The above and other objects, features and advantages of the present invention will become apparent from the following description when taken in conjunction with the accompanying drawings.

BRIEF DESCRIPTION OF THE DRAWINGS

FIGS. 4A, 4B, and 4C show memory maps of an internal ROM and RAM in a CPU 10;

FIG. 9A is a table showing the contents of the internal RAM in the CPU 10 according to another embodiment of the present invention;

FIGS. 15A and 15B show a circuit configuration for automatically changing the clock frequency in accordance with temperature;

FIG. 15C is a graph showing the temperature characteristics of a diode;

FIG. 15D is a graph showing the relationship between temperature T and clock frequency $\phi_0$;

FIG. 15E is a graph showing the relationship between temperature T and drive pulse width $\Delta T$;

DETAILED DESCRIPTION OF THE PREFERRED EMBODIMENTS

Figure 1:
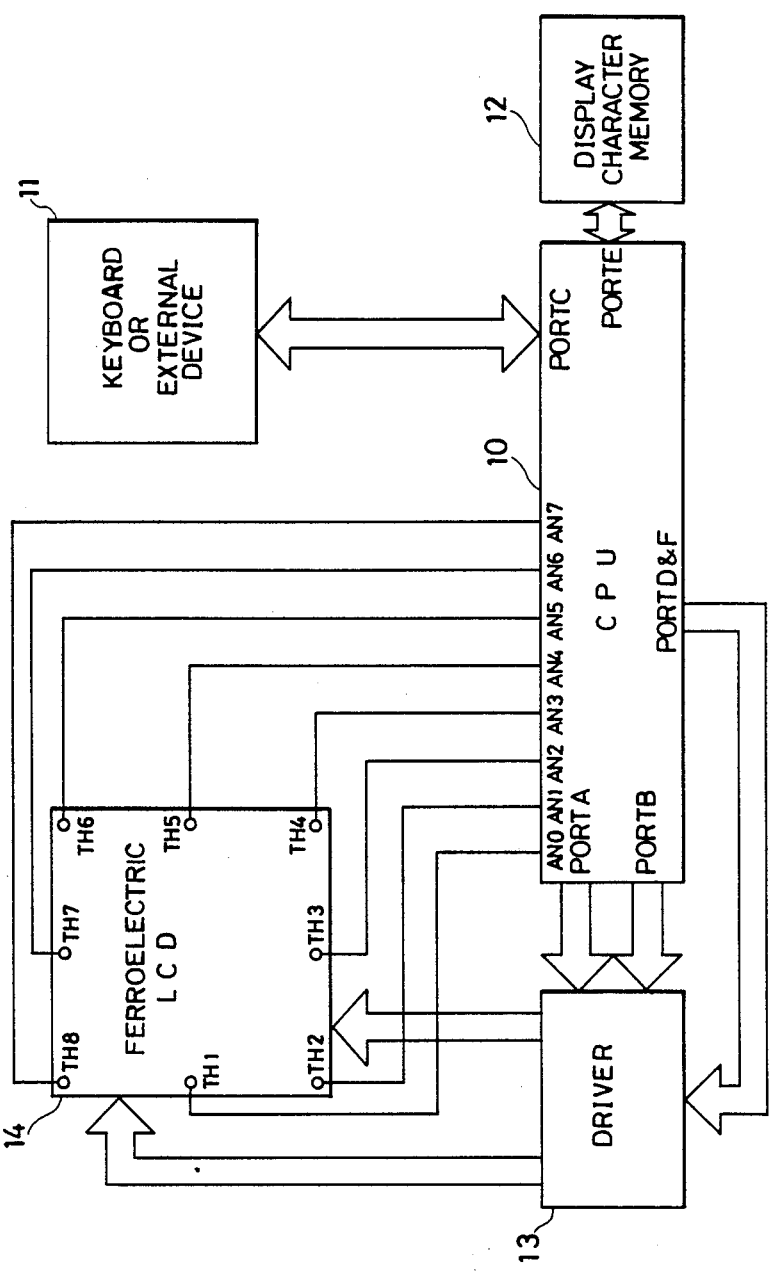
FIG. 1 is a block diagram showing the overall configuration of an embodiment of the present invention.

The preferred embodiment of the present invention will be described in detail with reference to the accompanying drawings.

In a display drive apparatus of this embodiment, a ferroelectric liquid crystal which is a display element with a threshold value having a high temperature dependency is driven.

The ferroelectric liquid crystal is a substance which has a first optically stable state or a second optically stable state in accordance with an applied electric field (i.e., a substance which is bistable with respect to an electric field); or a liquid crystal containing such a substance.

Most preferable bistable ferroelectric liquid crystals used in this embodiment are chiral smectic liquid crystals having a ferroelectric property. Among chiral smectic liquid crystals, a chiral smectic C-phase (Smc*) or H-phase (SmH*) liquid crystal is preferred. Such ferroelectric liquid crystals are described in, e.g., "LE JOURNAL DE PEYSIQUE LETTERS" 36 (L-69) 1975, "Ferroelectric Liquid Crystals"; "Applied Physics Letters" 36 (11) 1980, "Submicro Second Bistable Electrooptic Switching in Liquid Crystals"; "Kotai-Butsuri", (Solid-state Physics) 16 (141) 1981 "Liquid Crystals", and so on. In this embodiment, ferroelectric liquid crystals described in these literatures can be used.

More specifically, examples of the ferroelectric liquid crystal compounds which can be used in this embodiment may include deciloxybenzylidene-P'-amino-2-methylbutylcinnamate (DOBAMBC), hexyloxybenzylidene-P'-amino-2-chloropropylcinnamate (HOBACPC), and 4-0-(2-methyl)-butyliresorcyl-idene-4'-octylaniline (MBRA8).

When an LCD is prepared using such a liquid crystal compound, the compound is in a different liquid phase depending upon temperature. In the case of DOBAMBC, for example, a phase change from isotropic phase to smectic A phase occurs at about 117° C., and a phase change from smectic A phase to chiral smectic C phase occurs at about 93° C. The compound exhibits a ferroelectric property in the chiral smectic C phase. However, when the temperature reaches about 61° C., a change to a lower phase occurs.

The lower phase to the chiral smectic C phase is chiral smectic I phase, chiral smectic F phase or chiral smectic H phase according to various literatures. In any case, it is agreed that any of these phases exhibits a ferroelectric property.

The transition point from the smectic A phase to the chiral smectic C phase is the Curie point. At temperatures lower than the Curie point, the DOBAMBC has uniformly directed molecular dipoles and has spontaneous polarization. However, the DOBAMBC is known to have significantly different physical properties at different temperatures. For example, when the angle between the liquid crystal molecules and the normal to the LC layer is defined as the tilt angle $\theta$ (the layer has the same meaning as in the smectic phase), the angle $\theta$ increase with a decrease in temperature from the Curie point. Spontaneous polarization Ps also has temperature dependency (i.e., it increases with a decrease in temperature).

Elastic constant and viscosity coefficient are also known to change as functions of temperature. Response time (reaction of the molecular dipoles to an external electric field) and the critical electric field required for disturbing the helical pitch also change in accordance with temperature.

The above properties significantly change in each different phase. Even in a single phase (e.g., within a temperature range of about 30° C. from 91° C. to about 61° C. in the chiral smectic C phase), the physical properties also change and this result in changes in electrical responses.

The above situation is not limited to the DOBAMBC and is a common problem to all of so-called ferro-electric liquid crystals.

These phenomena also occur for a thin gap (e.g., 1 $\mu$m to 2 $\mu$m) which is subject to a bistable operation and result in changes in threshold value switching between two stable states. We found that the switching threshold value is not determined only by the DC amplitude but by the pulse width and the amplitude.

In view of this finding, according to the present invention, temperature compensation is performed by changing the pulse width of the display drive signal.

The alignment of the ferroelectric liquid crystal molecules in the cell will be described below.

In this embodiment, the cell substrate is obtained by coating a polyimide resin and rubbing the coated resin layer.

Figure 7:
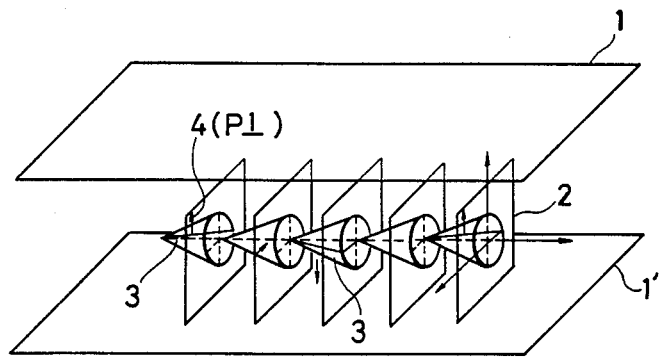
FIGS. 7 and 8 are diagrams for explaining the principle of a ferroelectric LCD.
Figure 8:
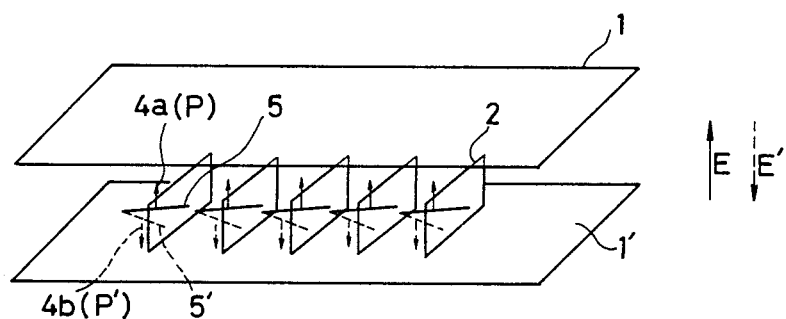

FIG. 7 illustrates a model of a ferrodielectric liquid crystal cell. Substrates (glass substrates) 1 and 1' have transparent electrodes (e.g., In$_2$O$_3$, SnO$_2$ or ITO (indium-tin oxide) electrodes) coated thereon. An SmC* phase liquid crystal is sealed between the substrates 1 and 1' such that liquid crystal molecular layers 2 are oriented in a direction perpendicular to the glass substrates. Liquid crystal molecules 3 (indicated by thick lines) have dipole moments (P⊥) 4 in a direction perpendicular thereto. When a voltage exceeding a given threshold voltage is applied to the electrodes on the substrates 1 and 1', the helical structure of the liquid crystal molecules 3 is disturbed and the orientation or alignment direction of the liquid crystal molecules 3 can be changed such that all the dipole moments (P⊥) 4 are directed along the applied electric field. The liquid crystal molecules 3 are elongated and have refractive index anisotropy in the major and minor axis directions. Therefore, when polarizers are arranged above and below the upper and lower glass substrates in a cross-nicol structure, it is easily understood that a liquid crystal optical modulation element having optical characteristics which change in accordance with the polarity of the voltage applied can be obtained. When the thickness of the liquid crystal cell is very thin (e.g., 1 $\mu$m), even if no electric field is applied, as shown in FIG. 8, the helical structure of the liquid crystal molecules is disturbed and the dipole moments P or P' are directed upward (4a) or downward (4b). In this manner, when an electric field E or E' of a different polarity exceeding a given threshold value is applied to the cell for a predetermined period of time, as shown in FIG. 8, the dipole moments 4 and 4' are directed upward 4a or downward 4b in accordance with the vector of the electric field E or E'. Accordingly, the liquid crystal molecules are aligned in a first alignment state 5 or a second orientation state 5'.

When such a ferroelectric liquid crystal is used as an optical modulation element, the following two advantages are obtained: first, the response time is very short and, second, the orientation of the liquid crystal molecules is bistable. The second advantage is described with reference to FIG. 8. When an electric field E is applied, the liquid crystal molecules are aligned in the first orientation state 5. This state is kept unchanged when the application of the electric $ field E is stopped. When the electric field E' of the opposite polarity is applied, the liquid crystal molecules are aligned in the second orientation state 5'. When the application of the electric field E' is stopped, this state is also kept unchanged. In either case, the liquid crystal molecules aligned in one direction are not reversed in orientation unless the applied electric field E or E' exceeds a predetermined threshold voltage. In order to effectively provide a short response time and good bistable operation, the cell is as thin as possible and in general has a thickness of 0.5 to 20 $\mu$m and, particularly, 1 to 5 $\mu$m. A liquid crystal-electro-optical apparatus having a matrix electrode structure using such a ferrodielectric liquid crystal is proposed by Clark and Ragabal in U.S. Pat. No. 4,367,924.

Drive control of a ferroelectric liquid crystal in this embodiment will be described in detail with reference to the accompanying drawings.

FIG. 1 is a block diagram showing the overall configuration of a drive apparatus for a ferrodielectric liquid crystal in this embodiment.

Referring to FIG. 1, a one-chip microcomputer (to be referred to as a CPU hereinafter) 10 has a control A/D converter. The CPU 10 consists of computer peripheral equipment including the A/D converter, a RAM, a ROM, and so on.

A keyboard 11 is a character input keyboard or a character data input section for an external device which sends character data in a predetermined mode.

A display character memory 12 is an external RAM for storing character data displayed on a ferro-electric LCD 14.

A driver 13 drives the LCD 14.

Separate power sources are provided for driving the CPU 10 and the LCD 14. When a main switch SW (not shown) is turned on, the CPU power source and the LCD power source are energized in the order named.

Figure 3:
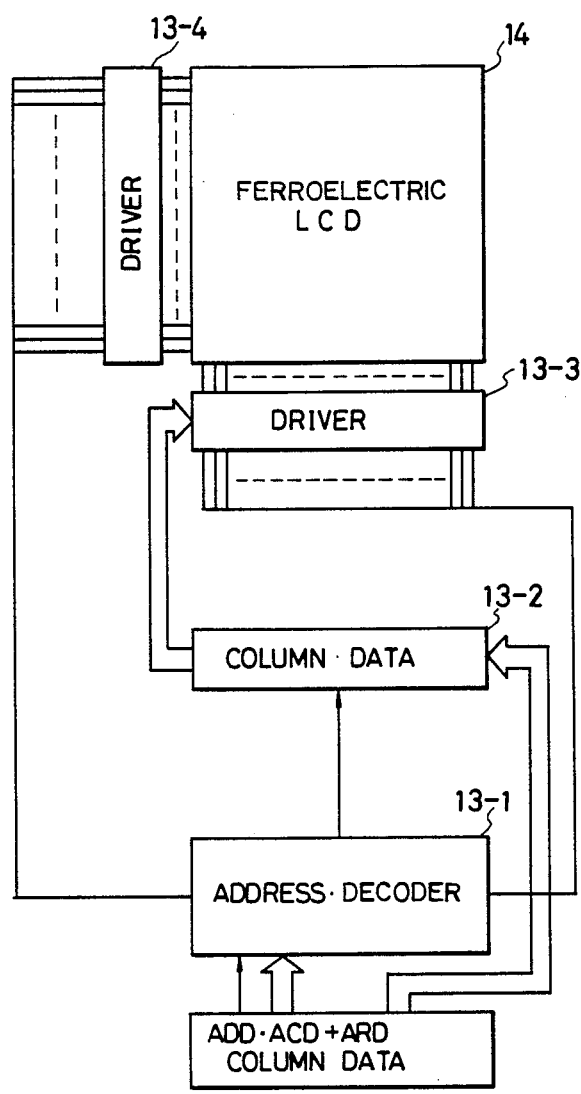
FIG. 3 is a detailed block diagram of a driver section 13 of a ferroelectric LCD.

FIG. 3 is a block diagram showing the configuration of the driver 13.

The driver 13 has an address decoder 13-1 for determining the addresses of drivers 13-3 and 13-4 of the LCD 14.

A column data circuit 13-2 outputs column data (image dot data) to the driver 13-3. The column data is originally supplied to the column data circuit 13-2 from the CPU 10.

Figures 4A, 4B:
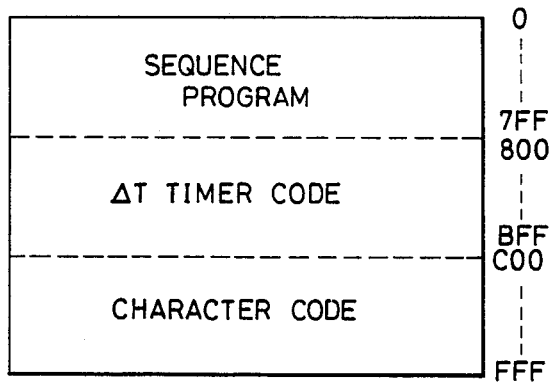
Figure 4D:
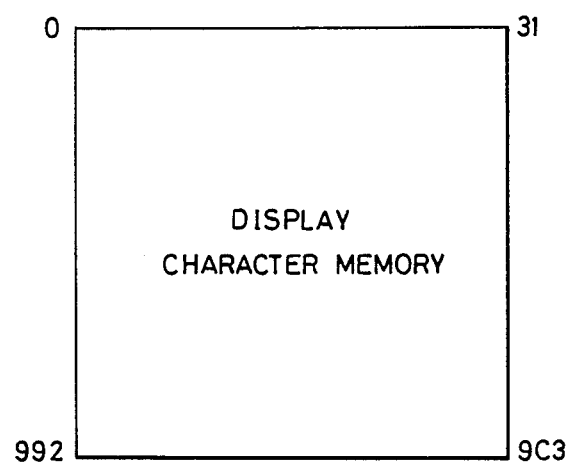
FIG. 4D is a diagram showing a display character memory 12.

FIGS. 4A, 4B, and 4C show the memory maps of the ROM and RAM as internal memories of the CPU 10. FIG. 4D shows the memory map of the display character memory 12.

Figure 5A:
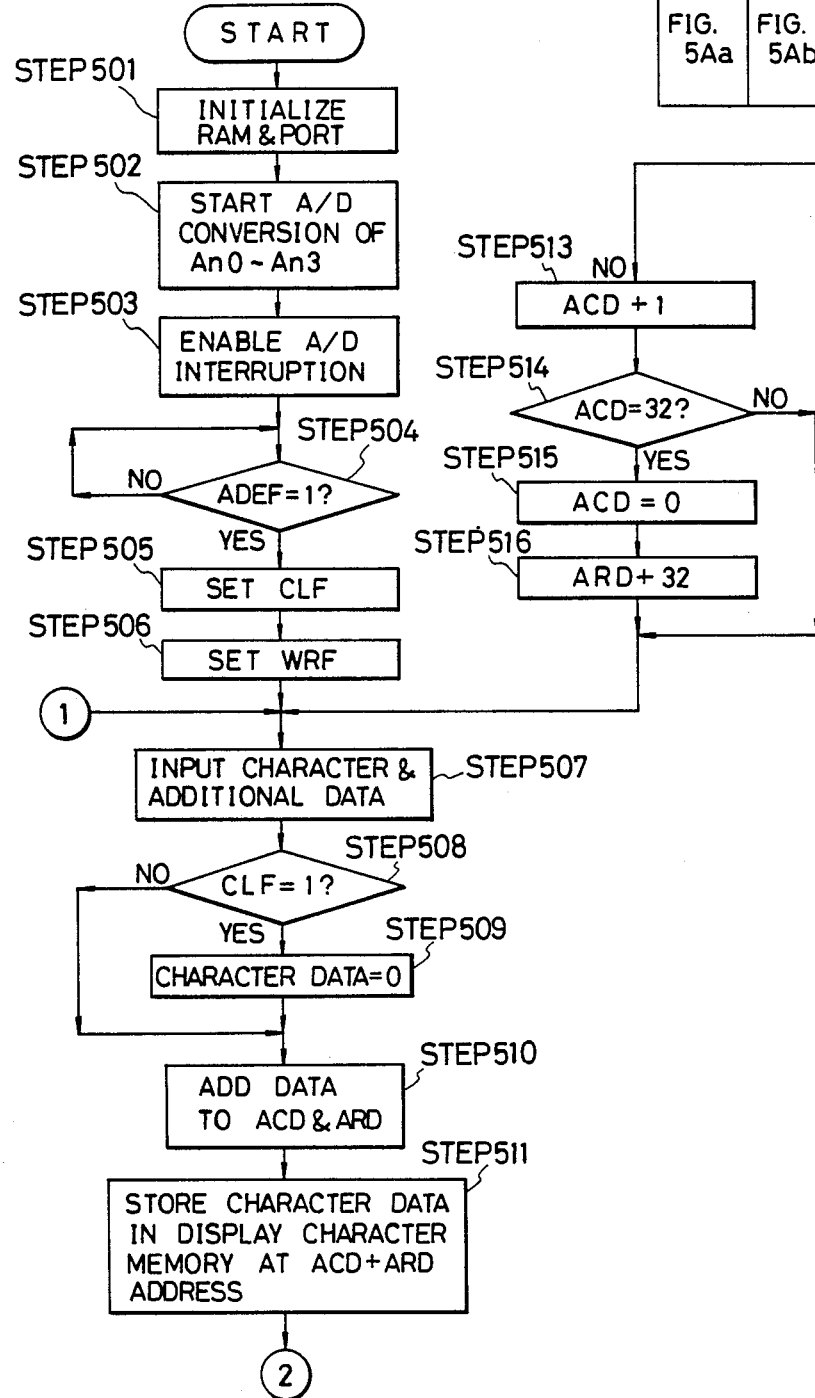
FIGS. 5A and 5B are flow charts of the control sequence of the CPU 10 of this embodiment.
Figure 5A:
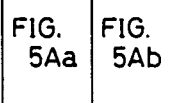
Figure 5A:
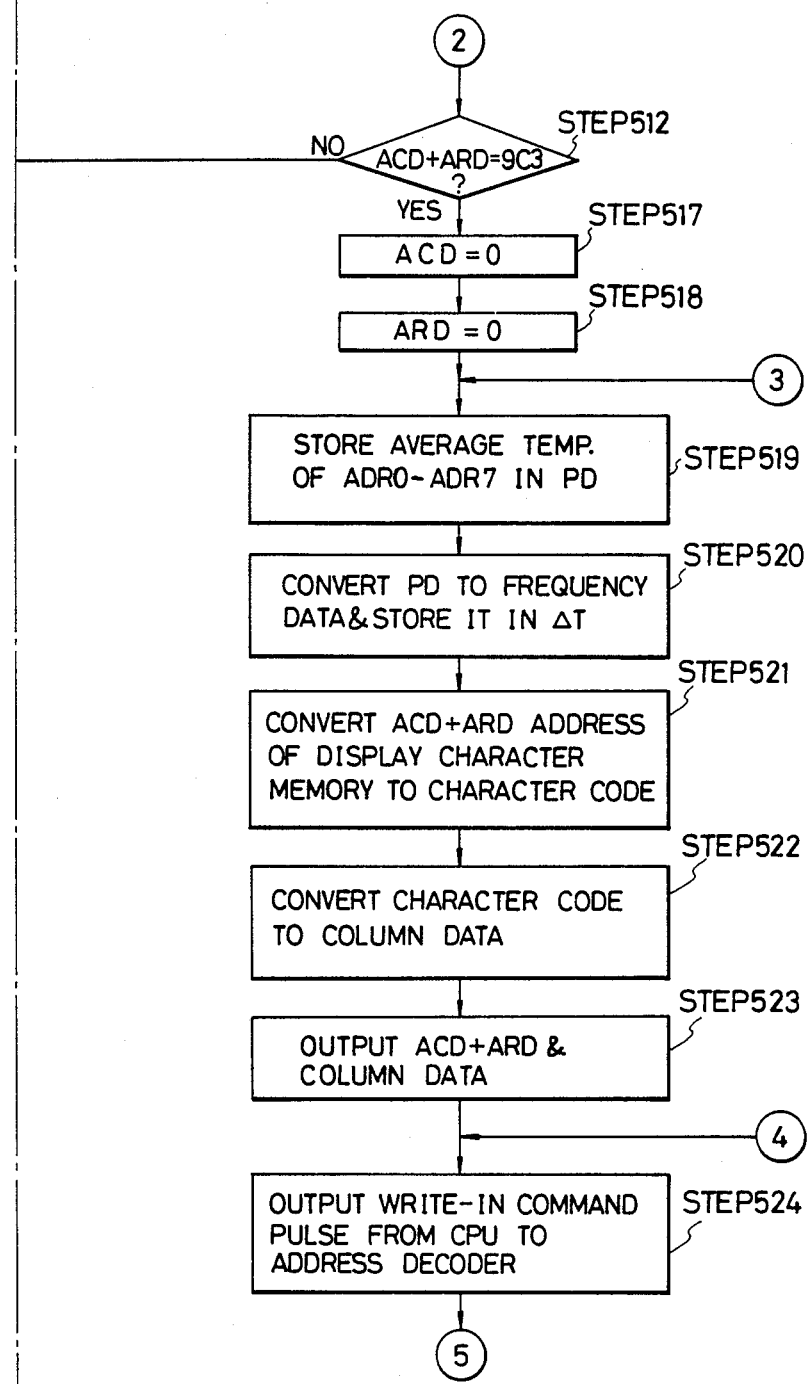
Figure 5B:
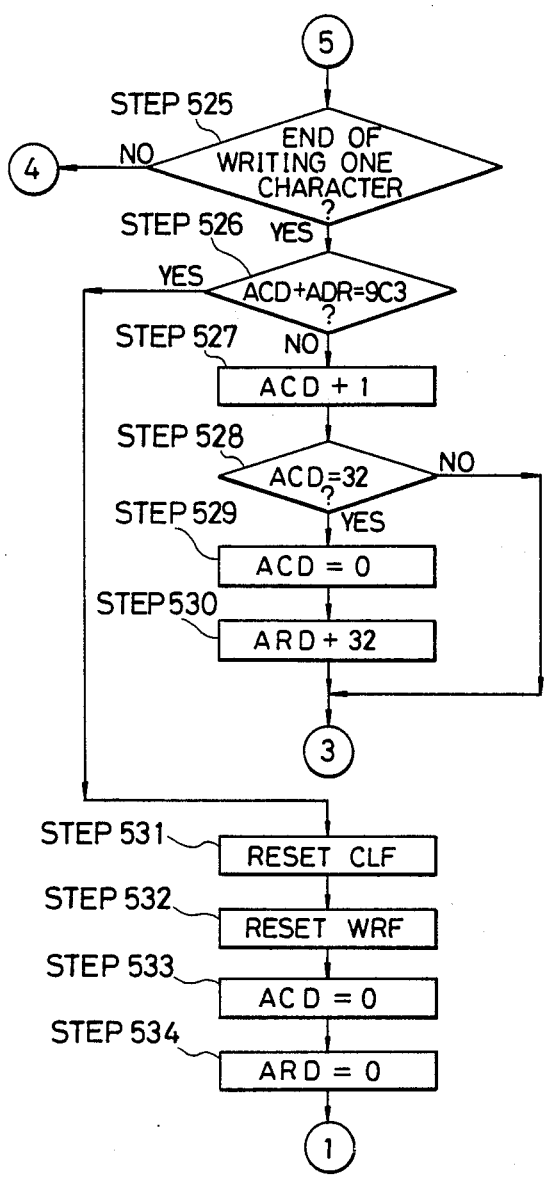

FIGS. 5A and 5B are flow charts of the control sequence of the CPU 10 in this embodiment. A description will now be made with reference to FIGS. 5A and 5B.

In step 501 of FIG. 5A, when the power source (not shown) is turned on, the I/O ports, the internal RAM and the display character memory 12 are initialized. Thus, the memory areas shown in FIGS. 4B, 4C, and 4D are cleared or initialized.

In step 502, the 8-channel (input)8-bit A/D converter in the CPU is started.

The CPU 10 used in this embodiment has four registers for automatically storing the A/D conversion results, and 4 channels for automatic A/D conversion and holding of the conversion results. For this reason, inputs An0 to An3 and An4 to An7 must be processed in two cycles by software. (If 8 registers and 8 channels are provided, this is not necessary.) In step 502, A/D conversion of inputs An0 to An3 is started. Since an interruption is generated upon conversion for each 4 channels, the A/D interruption is enabled in step 503.

Figure 6:
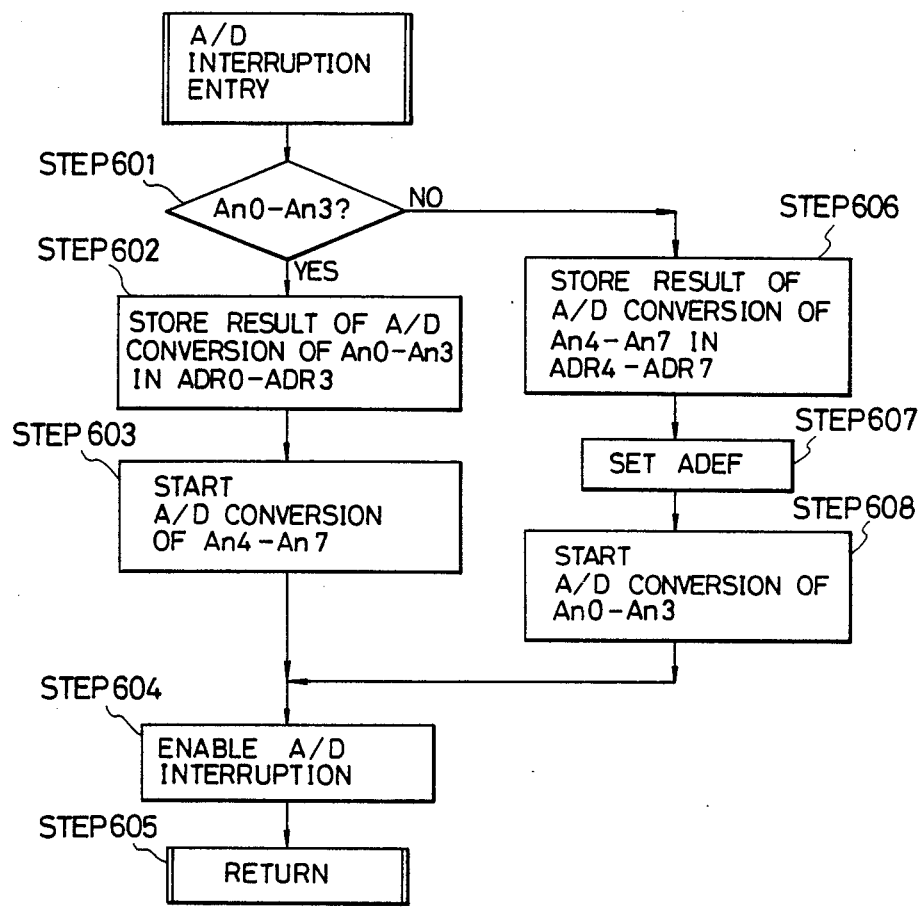
FIG. 6 is a flow chart of the A/D conversion interruption processing routine.

The A/D conversion shown in FIG. 6 will be described since the operation occurs in this order. An A/D interruption is generated for each 200 μsec, and the processing of the flow chart shown in FIG. 6 is started. In step 601 in FIG. 6, it is checked if the A/D converted channels are An0 to An3 or An4 to An7. If the current A/D conversion is the first A/D conversion, the channels are An0 to An3 which were designated in step 502. Therefore, YES is obtained in step 601, and the flow advances to step 602 in FIG. 6. In step 602, the A/D conversion results for An0 to An3 are transferred to memory areas ADR0 to ADR3 in the internal RAM in FIG. 4C. In step 603, A/D conversion for An4 to An7 is started. In step 604, the A/D interruption is enabled. In step 605, a return command is executed and the count of the program counter before the interruption was made is incremented by one. In this manner, the routine in FIG. 5 is continuously processed. However, if NO in step 601 in FIG. 6, it is the case wherein an even-numbered interruption has been made for An4 to An7. In this case, the flow advances to step 606. In step 606, the A/D conversion results for An4 to An7 are transferred to memory areas ADR4 to ADR7 in the internal RAM shown in FIG. 4C Upon such processing, entire temperature data at each point of the ferroelectric LCD has been held in the memory areas ADR0 to ADR7 of the internal RAM in FIG. 4C, and subsequent processing using the temperature data can be performed. In step 607, an A/D conversion end flag ADEF, for first An0 to An7, which is allocated at bit 0 of address 0 of the internal RAM shown in FIG. 4B is set to "1".

In step 608, A/D conversion for next An0 to An3 is started, and processing in steps 604 and 605 is performed. These processes are repeated as long as the CPU power source is energized. Therefore, the temperature data in the memory areas ADR0 to ADR7 in the internal RAM shown in FIG. 4C is constantly updated.

A description will now be made referring back to FIG. 5A. In step 504, the flag ADEF allocated at bit 0 of address 0 of the internal RAM shown in FIG. 4B is checked. This checking is repeated until the flag is detected to be set. When the flag ADEF is set, the flow advances to step 505. In step 505, a display clear flag CLF allocated at bit 2 of address 2 of the internal RAM in FIG. 4B is set. In step 506, a write-in flag WRF allocated at bit 1 of address 0 in the internal RAM in FIG. 4B is set. When the two flags are set in this manner, the ferroelectric LCD is initialized by processing to be described later.

In steps 507 to 512, the contents of the display character memory 12 serving as the external RAM shown in FIG. 4D are updated. More specifically, in step 507 in FIG. 5A, character data is input in a predetermined type in response to a request from the keyboard or input section for the external device, or a display initialization request in steps 505 and 506 is awaited When a request including setting of the write-in flag allocated at bit 1 of address 0 in the internal RAM in FIG. 4B is received, the flow advances to step 508. In step 508, the clear flag CLF allocated at bit 2 of address 0 of the internal RAM shown in FIG. 4B is checked. If the flag CLF is set, a value "0" for clearing the character data is stored in step 509. However, if the flag CLF is not set, the character data input in a predetermined type is held and the flow advances to step 510.

In step 510, the column address data ACD and row address data ARD (as the address data of the character data) for the ferroelectric liquid crystal matrix shown in FIG. 4C are added. In step 511, the character data is stored at ACD+ARD address in the display character memory 12. The address data is in hexadecimal notation.

In step 512, it is checked if ACD+ARD address corresponds to end address 9C3 of the character memory 12 (9C3=2,500 or 50 characters×50 characters). If YES in step 512, the flow advances to step 517. However, if NO in step 512, the flow advances to step 513.

In step 513, the address ACD is incremented by 1. In step 514, it is checked if the address ACD is 32 so as to check if data input for 50 characters has been completed. If YES in step 513, the flow advances to step 515. However, if NO in step 513, the flow returns to step 507 and character data is input.

The address ACD is cleared in step 515, 32 is added to the address ARD in step 516, and the flow returns to step 507.

When input of 1-frame character data for the LCD 14 is completed and the flow advances from step 512 to step 517, the address ACD is cleared in step 517 and the address ARD is cleared in step 518. This is performed to update the address to the start address since the address is used as a reference address for the display character memory 12 as the external memory shown in FIG. 4D.

Figure 2A:
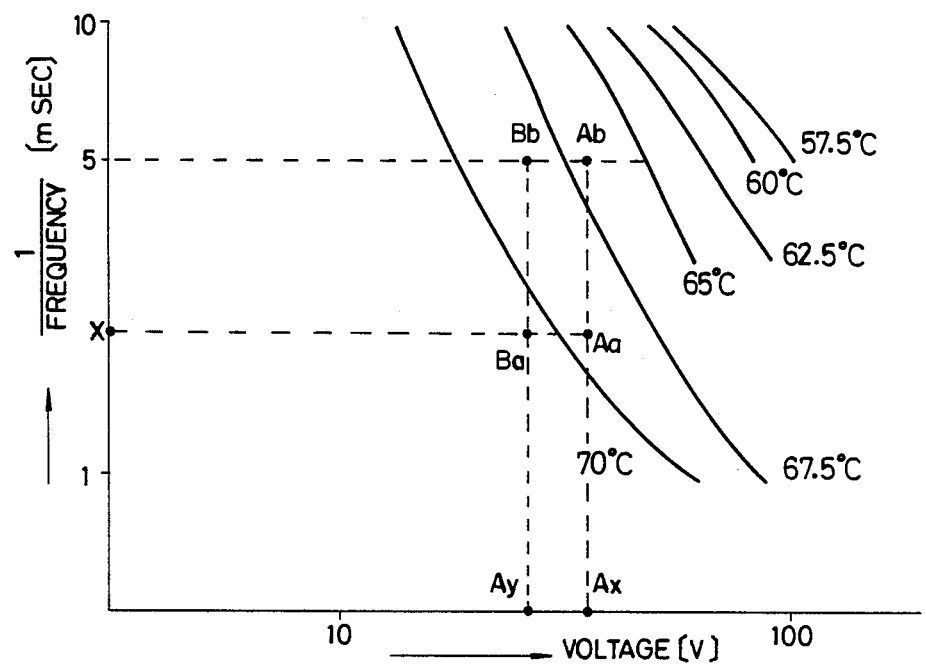
FIG. 2A and 2B are graphs showing the drive frequency vs. drive voltage characteristics of a ferroelectric liquid crystal using temperature as a parameter.
Figure 2B:
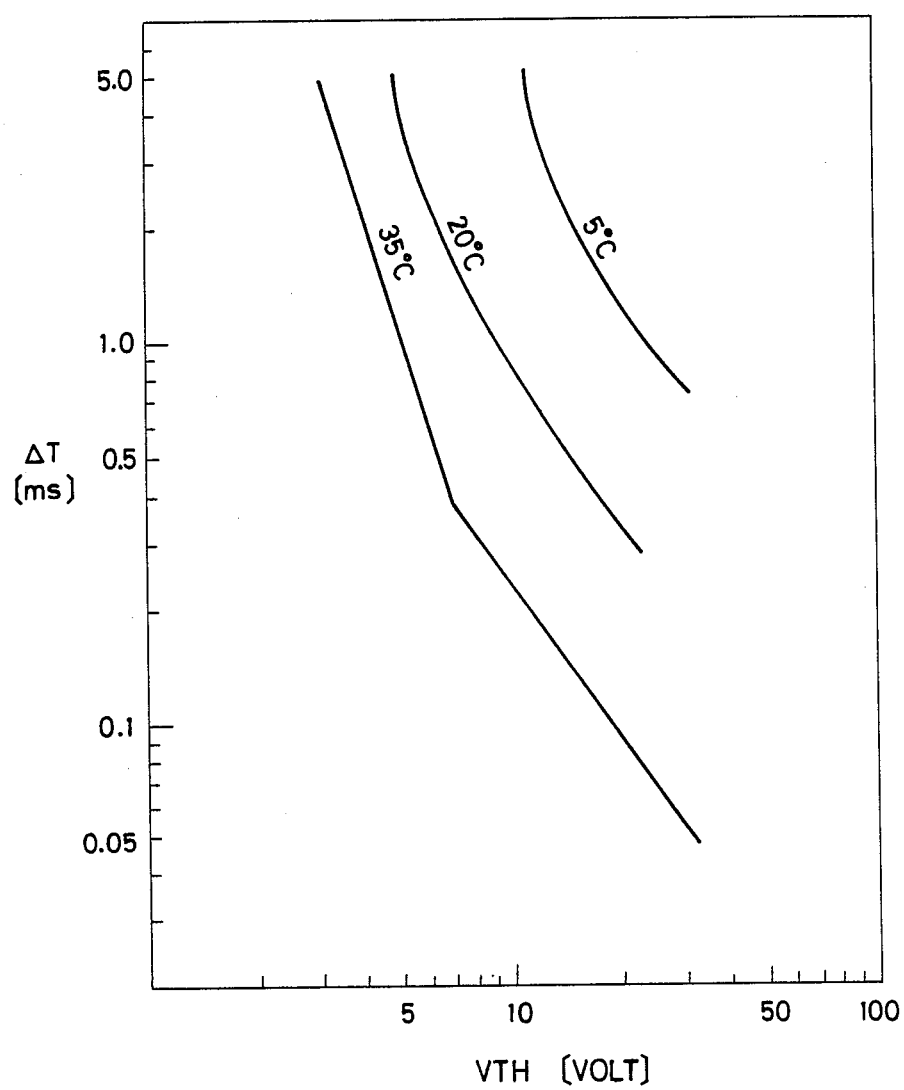

In step 519, operations are performed using the areas ADR0 to ADR7 of the internal RAM in FIG. 4C as the peripheral temperature data of the LCD 14 in order to calculate the average temperature. The calculated average temperature is stored in a memory area PD of the internal RAM in FIG. 4C. In step 520, $\Delta T$ time data is extracted, referring to $\Delta T$ timer code assigned to addresses 800 to BFF in the internal ROM in FIG. 4A, and the extracted data is stored in a memory area $\Delta T$ in the internal RAM in FIG. 4C. This temperature-$\Delta T$ conversion is performed referring to the drive frequency vs. drive voltage characteristics using temperature as a parameter shown in FIGS. 2A and 2B. A typical conversion example referring to FIG. 2A is shown in Table 1 below. In this example, the drive voltage is kept constant at 70 V.

TABLE 1

| Temperature | 57.5° C. | 60° C. | 62.5° C. | 65° C. | 67.5° C. | 70° C. |
|---|---|---|---|---|---|---|
| 1/frequency | 8.9 msec | 7.9 msec | 5.5 msec | 3 msec | 1.55 msec | 1 msec |

The temperature detection resolution is about 0.4° C. since 8-bit A/D conversion is performed within a temperature range of 0° C. to 100° C. The resolution of pulse width $\Delta T$ of the drive signal is 1 $\mu$sec and can cover 1 $\mu$sec to 65.5 msec. In step 521, the character data at ACD+ARD address of the memory 12 as the external RAM in FIG. 4D is converted into a predetermined code referring to the character codes assigned to addresses C000 to FFF in the internal ROM in FIG. 4A.

In step 522, the predetermined codes are converted into column data or dot data by a character generator in the CPU 10. In step 523, the ACD+ARD address data and the column data are supplied to the address decoder 13-1 and column data circuit 13-2 shown in FIG. 3.

The ACD+ARD address data supplied to the address decoder 13-1 is converted into the address data corresponding to the column data by the address decoder 13-1. One character has 32×32 dots. The ACD+ARD address data is converted into dot row address data ARD' and dot column address data ACD' as dot address data of the LCD 14 which corresponds to the address in the display character memory 12. The dot column address data ACD' is supplied to the driver 13-3, and the dot row address data ARD' is supplied to the driver 13-3, and the dot row address data ARD' is supplied to the driver 13-4. The LCD 14 has a resolution of 8 dots/mm in both of the vertical and horizontal directions.

In step 524, a write-in command pulse is supplied to the address decoder 13-1 from the CPU 10. The pulse width of the write-in command pulse is set by the CPU 10 to be $\Delta T$ in accordance with the time data stored in $\Delta T$ in step 520.

In response to the write-in command pulse, the address decoder 13-1 supplies a write-in signal having the pulse width $\Delta T$ to the drivers 13-3 and 13-4 and writes the character data.

In step 525 in FIG. 5B, it is checked if column data of one character has been written. If NO in step 525, the flow returns to step 524. In step 524, another write-in command pulse is supplied to the address decoder 13-1.

This operation is repeated until one character is written. When one character is written, the flow advances to step 526.

Whether one character is input or not is determined in step 525 by checking a write-in end signal supplied to the CPU 10 from the address decoder 13-1 when column data of one character is written.

In steps 526 to 530, addresses ACD and ARD are incremented as in steps 512 to 516.

In this manner, steps 519 to 530 are repeated until characters of one frame are written in the LCD 14. When characters of one frame are written, the flow advances from step 526 to step 531.

The flag CLF is reset in step 531, the flag WRF is reset in step 532, and the addresses ACD and ARD are cleared in steps 533 and 534. The flow returns to step 507, and the next request is awaited.

In this embodiment, the temperature of the LCD 14 is detected, and the pulse width of the drive signal is changed in accordance with the detected temperature so as to perform drive control. Therefore, an external unit such as a heater is not required for temperature control, and the overall apparatus can be rendered simple and inexpensive.

As an application of the embodiment described above, the ferroelectric LCD can be divided into a plurality of blocks, the average temperature for each block is detected, and the pulse width is changed and drive control is performed for each block in accordance with the detected average temperature.

Drive control for a ferroelectric liquid crystal using an average temperature for each block will be described as another embodiment of the present invention.

The overall configuration of the apparatus of this embodiment is the same as that shown in FIGS. 1 and 3. This embodiment is different from that shown in FIGS. 1 and 3 in that the average temperature data in areas PDAn0 to PDAn7 in FIG. 4C becomes BPD1 (average temperature data for An0, An6 and An7), BPD2 (average temperature data for An4, An5 and An6), BPD3 (average temperature data for An0, An1 and An2), and BPD4 (average temperature data for An2, An3 and An4) in FIG. 9A; and the display character memory 12 shown in FIG. 4D is divided into four blocks BPD1, BPD2, BPD3 and BPD4 shown in FIG. 4B.

Figure 10A:
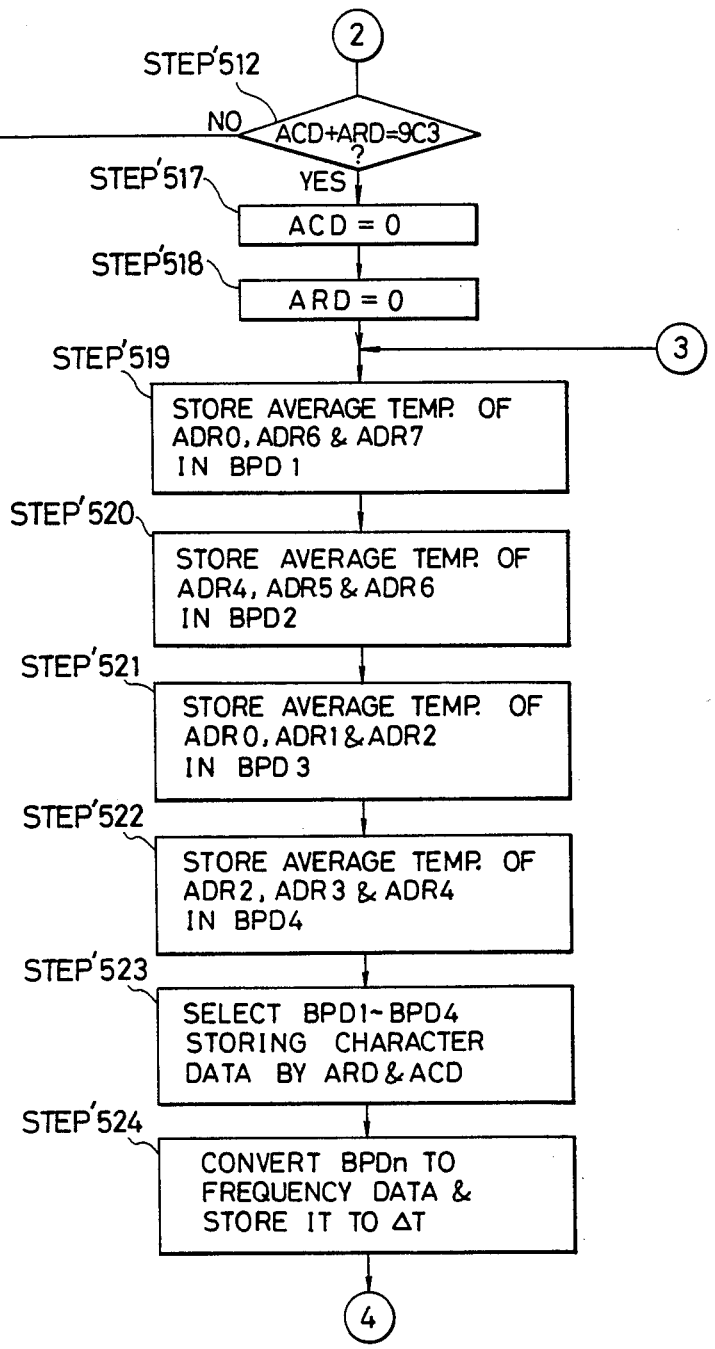
FIGS. 10A and 10B are flow charts of the control sequence of the CPU 10 according to the another embodiment of the present invention.
Figure 10B:
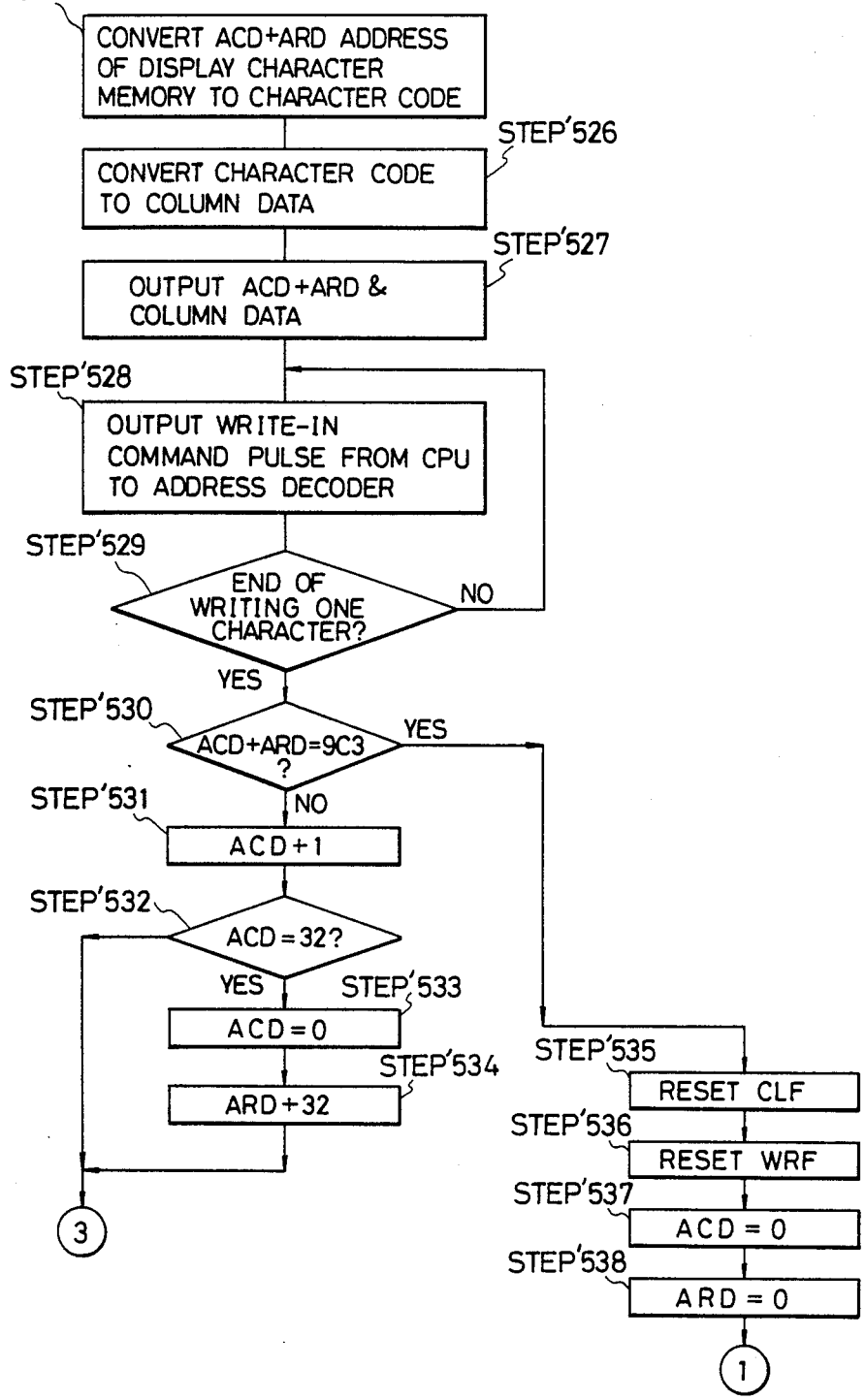

FIGS. 10A and 10B are flow charts of the control sequence of the CPU 10 when the LCD 14 is divided into a plurality of blocks, and the pulse width of the drive signal is changed for each block in accordance with the average temperature of the block, thereby controlling the drive operation of the LCD 14.

Since steps 501 to 518 in FIG. 10A are the same as steps 501 to 518 in FIG. 5A, a description thereof will be omitted. The A/D conversion interruption is generated at every 200 $\mu$sec in the A/D conversion routine in this embodiment as in the A/D conversion routine shown in FIG. 6.

Figure 9B:
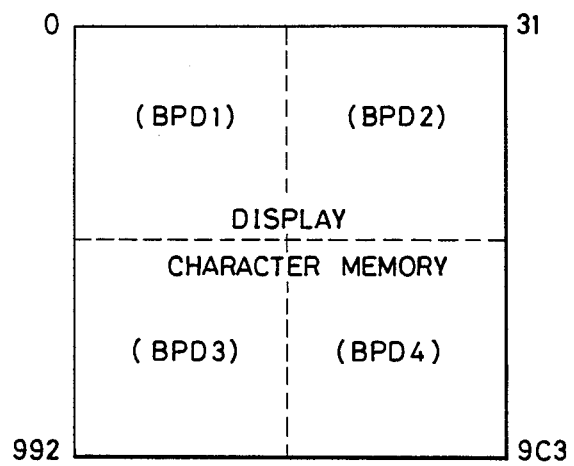
FIG. 9B shows a display character memory in another embodiment of the present invention.

In step 519, the average value of the temperature data in the areas ADR0, ADR6 and ADR7 of the internal RAM in FIG. 9A is stored in the area BPD1. In step 520, the average value of the temperature data in the areas ADR4, ADR5 and ADR6 of the internal RAM in FIG. 9A is stored in the area BPD2. IN step 521, the average value of the temperature data in the areas ADR0, ADR1 and ADR2 is stored in the area BPD3. In step 522, the average value of the temperature data in the areas ADR2, ADR3, and ADR4 of the internal RAM in FIG. 9A is stored in the area BPD4.

In step 523, it is checked which one of the blocks BPD1 to BPD4 corresponds to the character data in accordance with the ARD and ACD address data. In step 524, the average temperature data of the block corresponding to the character data is converted into time data and stored in ΔT as in the first embodiment. Subsequent steps 525 to 538 are performed in the same manner as steps 521 to 534 in FIGS. 5A and 5B. The pulse width of the write-in signal is changed in accordance with the average temperature data of each block, and drive control of the LCD 14 is thus performed.

With the above embodiment, since the drive operation of the ferroelectric LCD is controlled by changing the pulse width of the write-in signal in accordance with the average temperature data for each predetermined display region of the display area, a high-precision display drive apparatus can be provided.

The above embodiments are described with reference to a display element using a ferroelectric liquid crystal. However, the present invention is similarly applicable to display elements which have a switching threshold value which is temperature-dependent and in which the pulse width of the write-in drive signal influences switching.

According to the present invention, when a display element having a threshold value with a high temperature dependency is driven, temperature control by a heater or the like need not be performed and the voltage of a drive signal need not be changed. Therefore, the apparatus can be simplified and rendered inexpensive.

In addition there can be used in the present invention another drive for a display element such as is arranged to display dot data in synchronization with a scan of a predetermined period.

In the above embodiments, the CPU 10 selects the pulse width ΔT of the drive signal in accordance with the temperature data from a temperature sensor.

A third embodiment will now be described wherein the pulse width or the voltage of the drive signal is changed in accordance with temperature.

Figure 11:
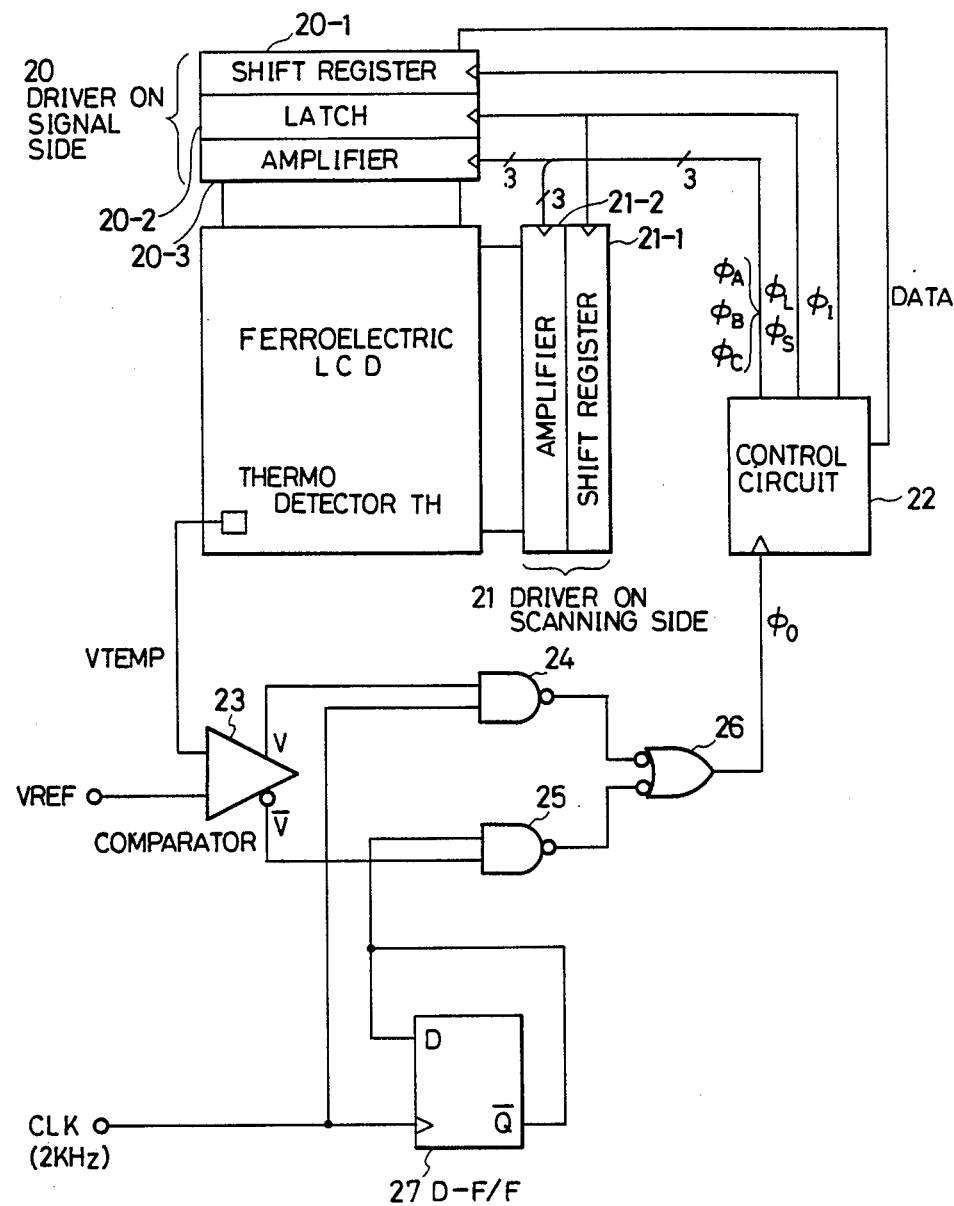
FIG. 11 is a block diagram of a circuit configuration for changing the pulse width in accordance with temperature.

FIG. 11 shows a circuit configuration for changing the pulse width ΔT in two steps; 250 μsec in a high-temperature range (T>T$_0$) and 500 μsec in a low-temperature range (T<T$_0$). The switching temperature T$_0$ can be adjusted using a reference voltage V$_{ref}$ to be described later. In this embodiment, T$_0$ is set at 10° C.

In the circuit configuration shown in FIG. 11, the pulse width ΔT is changed in accordance with whether the temperature is higher or lower than the switching temperature T$_0$.

Referring to FIG. 11, an output from a thermo detector Th mounted on a ferroelectric LCD 14 is supplied to a comparator 23. If this input voltage V$_{temp}$ is higher than the preset voltage V$_{ref}$ (T≧10° C.), the output from the comparator 23 becomes:

V=HIGH, V̄=LOW.

If the input voltage V$_{temp}$ is lower than the preset voltage V$_{ref}$(T≦10° C.), the output from the comparator 23 becomes:

V=LOW, V̄=HIGH.

The frequency of a control clock φ$_0$ supplied to a control circuit 22 is switched between 2 kHz or 1 kHz by gate circuits 24, 25 and 26 in accordance with the above temperature condition. A D-type flip-flop 27 frequency-divides the 2-kHz clock and outputs a 1-kHz clock.

When the control clock φ$_0$ supplied to the control cirucit 22 has a frequency of 2 kHz, the outputs ΔT from drivers 20 and 21 have a pulse width of 250 μsec. However, when the control clock φ$_0$ has a frequency of 1 kHz, the outputs ΔT from the drivers 20 and 21 have a pulse width of 500 μsec.

Figure 12:
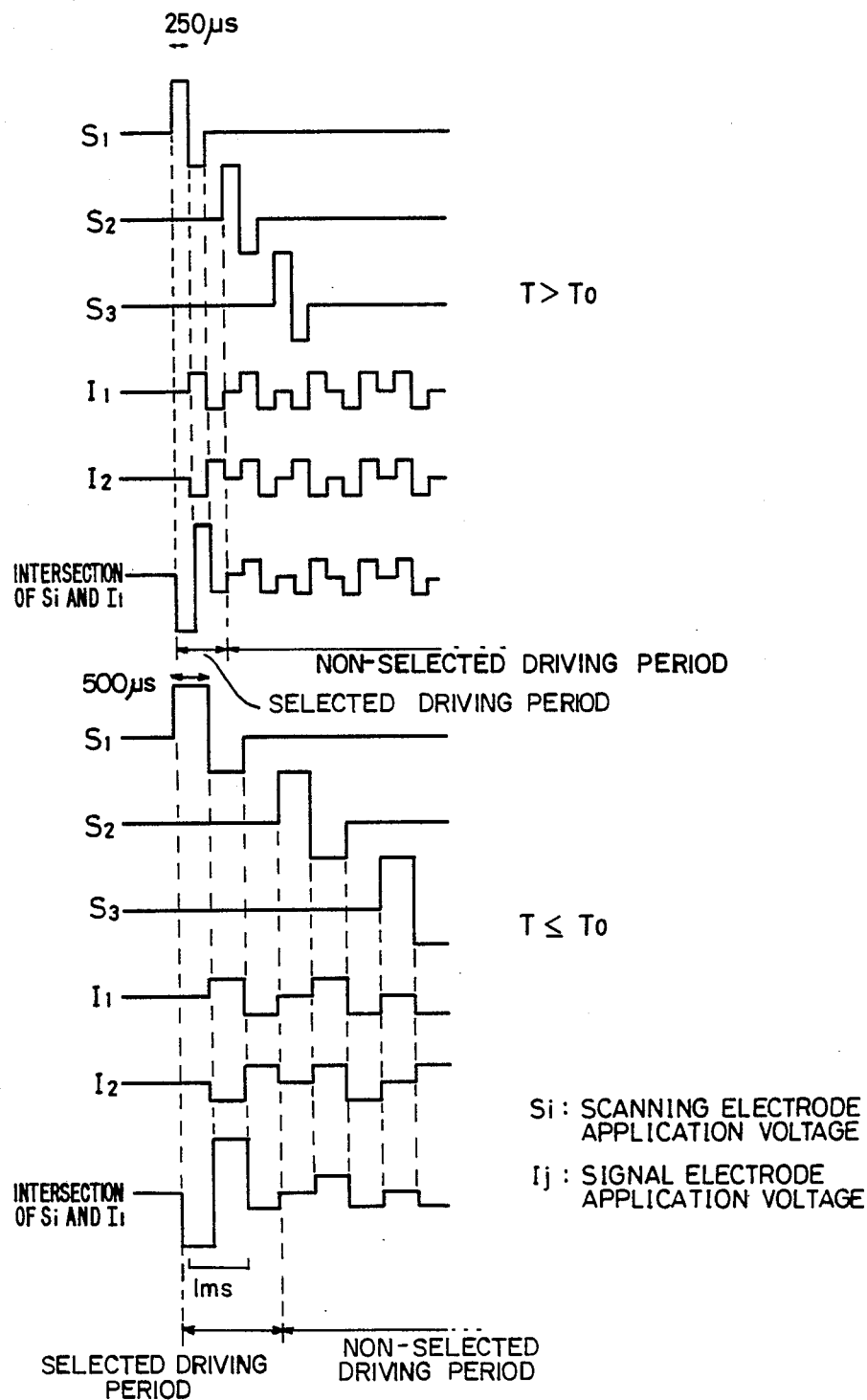
FIGS. 12 and 13 are timing charts of the circuit shown in FIG. 11.
Figure 13:
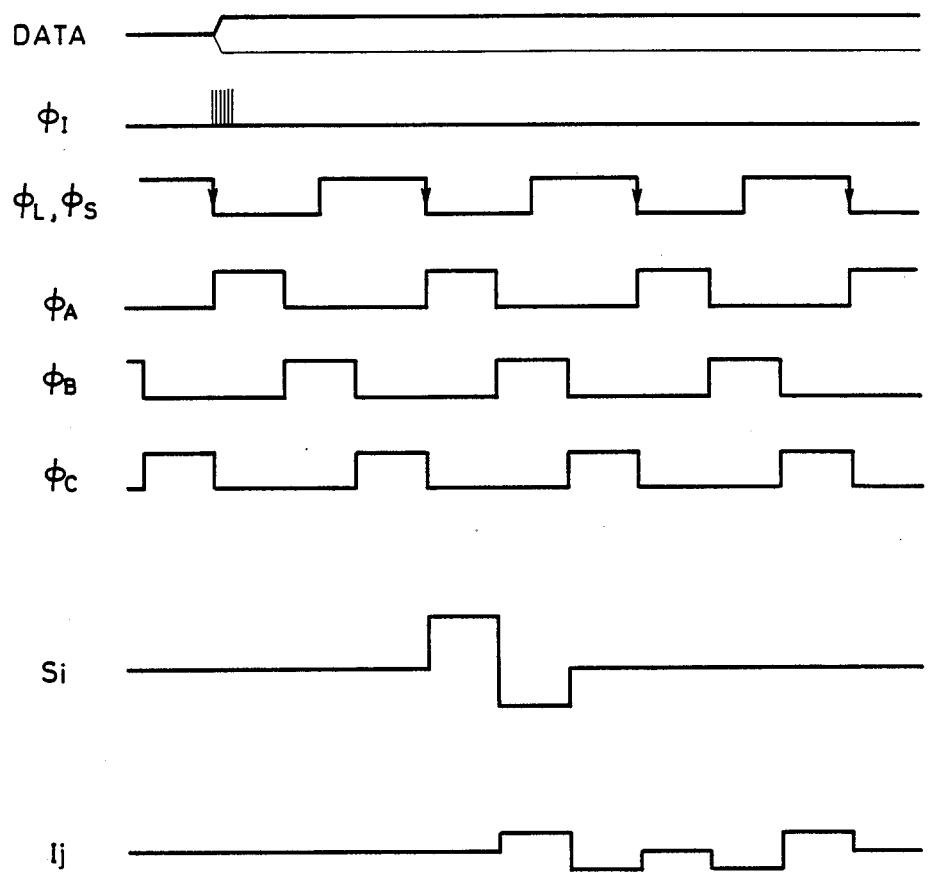

Control of the drivers 20 and 21 by the control circuit 22 will be described with reference to FIGS. 12 and 13.

The driver 20 on the signal side consists of a shift register 20-1, a latch 20-2, and an amplifier 20-3. The driver 20 is a conventional liquid crystal driver. A shift clock φ$_I$ is supplied from the control ciruit 22 to the shift register 20-1. In synchronism with the shift clock φ$_I$, image data is serially transferred from the control circuit 22 to the driver 20. When data transfer of one line of the LCD 14 is completed, a latch pulse φ$_L$ is generated by the control circuit 22. In response to the latch pulse φ$_L$, image data which has been stored in the shift register 20-1 is latched in the latch 20-2 and supplied to the amplifier 20-3. In response to the image data and three-phase clocks φ$_A$, φ$_B$ and φ$_C$ from the control circuit 22, the amplifier 20-3 generates a drive pulse I$_j$ and supplies it to the signal electrode of the LCD 14. In this case, φ$_A$=φ$_B$=φ$_C$, and the pulse width of the drive pulse is determined by the three-phase clocks φ$_A$, φ$_B$ and φ$_C$.

The driver 21 on the scanning side consists of a shift register 21-1 and an amplifier 21-2. The driver 21 is also a conventional liquid crystal driver. The shift clock φ$_S$ for the shift register 21-1 is the same as the latch pulse φ$_L$ for the driver 20. Each time one-line data is transferred, the selected scanning line is shifted one by one. The amplifier 21-2 generates a drive pulse S$_i$ in response to the clocks φ$_A$, φ$_B$ and φ$_C$ as in the driver 20 side, and supplies it to the scanning electrode of the LCD 14. The pulse width of the drive pulse at the side of the driver 21 is also determined by the three-phase clocks φ$_A$, φ$_B$ and φ$_C$ as in the case of the driver 20.

Generation of the drive signal in response to the three-phase clocks φ$_A$, φ$_B$ and φ$_C$ will be described with reference to a circuit wherein the voltage of the drive signal is changed in accordance with temperature of the ferroelectric LCD.

In the configuration shown in FIG. 11, the pulse width ΔT is switched in two steps in accordance with temperature. However, the pulse width ΔT can be changed in a larger number of steps in accordance with temperature.

Figure 14:
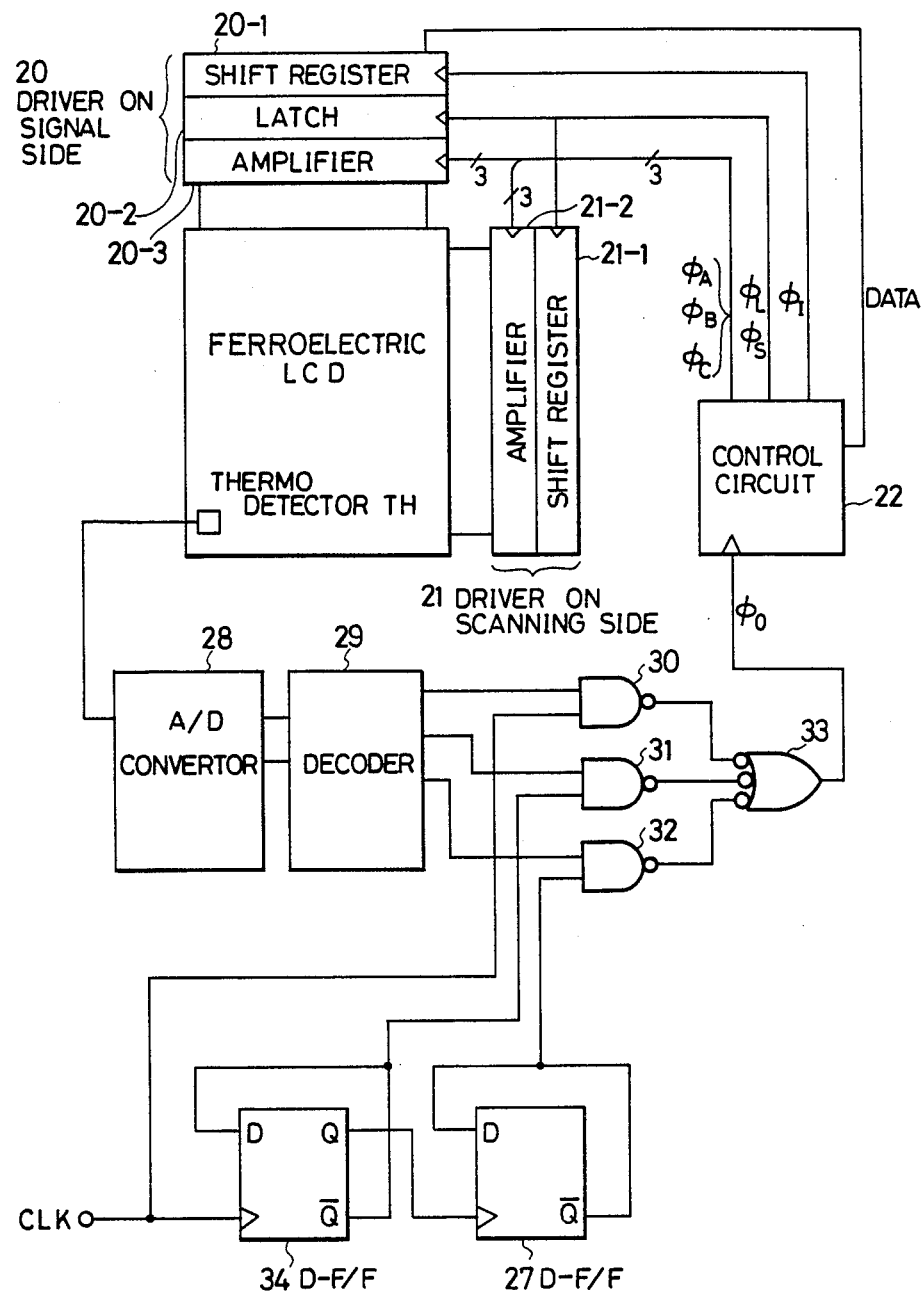
FIG. 14 is a block diagram of a modification of the circuit shown in FIG. 11.

FIG. 14, for example, shows a circuit configuration for changing the pulse width of a drive signal in three steps in accordance with temperature.

In the configuration shown in FIG. 14, a clock is frequency-divided in two steps by D-type flip-flops 27 and 34. The voltage value of the thermo detector Th is converted into digital data by an A/D converter 28. The digital data from the A/D converter 28 is decoded by a decoder 29. Three clocks are selected by gate circuits 30, 31, 32 and 33 in accordance with the decoding results.

Figure 15A:
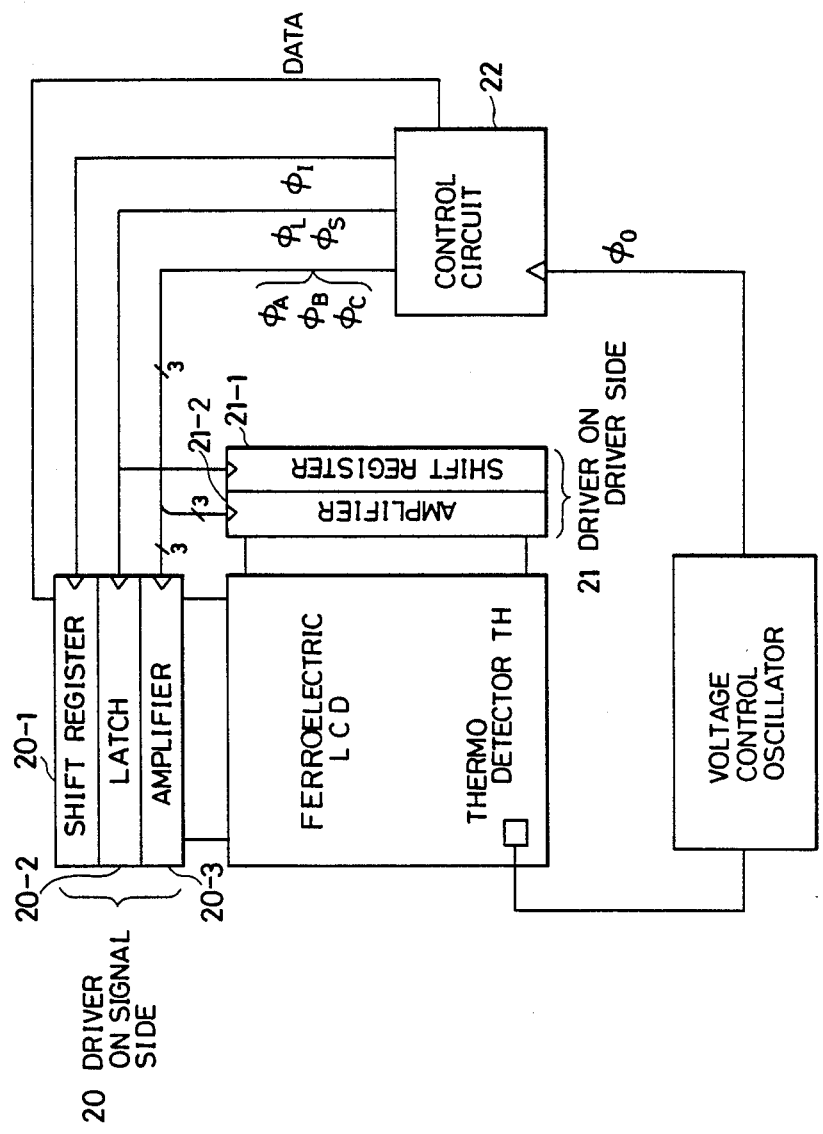

FIGS. 15A and 15B show a circuit configuration for automatically and continuously changing the pulse width of the drive signal in accordance with temperature.

FIG. 15B shows the configuration of a voltage controlled oscillator VCO in FIG. 15A.

FIG. 15C is a graph showing the relationship between temperature T and diode forward-bias voltage $V_F$. FIG. 15D shows the relationship between temperature T and clock frequency $\phi_0$. FIG. 15E shows the relationship between temperature T and pulse width $\Delta T$ of the drive signal.

In the circuit configuration shown in FIGS. 15A and 15B, a diode is used as a thermo detector Th. The diode has temperature characteristics as shown in FIG. 15C. A voltage controlled oscillator VCO automatically changes the clocks in accordance with the temperature of the LCD 14 utilizing the temperature characteristics of the diode.

As can be seen from FIG. 15C, when the temperature T of the display LCD increases, the forward voltage $V_F$ of the diode (thermo detector Th) decreases. When the forward voltage $V_F$ is high, the collector current of a transistor $Q_2$ increases, a voltage drop across a resistor $R_1$ increases, and the potential at point A decreases. However, when the forward voltage $V_F$ decreases, the collector current of a transistor $Q_2$ decreases and the potential at point A increases.

The voltage controlled oscillator VCO oscillates at a resonant frequency determined by a variable capacitor (varicap) $V_C$ and inductance L. Thus, the clock frequency is determined by the values of $V_C$ and L. The capacitance of the capacitor $V_C$ has a voltage dependency; when the potential at point A changes, the resonant frequency changes and so does the clock frequency. FIG. 15D show the relationship between the temperature T and clock frequency determined in this manner.

Referring to FIG. 15B, resistors $R_1$ and $R_2$ determine the gain of a differential amplifier circuit 35. A resistor $R_3$ serves as an emitter current-limiting resistor for the transistors $Q_1$ and $Q_2$. A transistor $Q_3$ is a constant current source. Resistors $R_4$ and $R_5$ are bias resistors for the transistor $Q_3$. A resistor $R_6$ serves as a diode current-limiting resistor. A resistor $R_7$ suppresses the leakage current of the capacitor $V_C$. Capacitors $C_1$ and $C_2$ are DC cut capacitors. A resistor $R_8$ serves as a bias resistor for a transistor $Q_4$. A resistor $R_7$ serves as a current-limiting resistor for the transsistor $Q_4$ and also serves to obtain a desired amplitude waveform.

A circuit configuration for automatically changing the voltage of a drive signal in accordance with the temperature of a ferroelectric LCD will be described below.

Figure 16A:
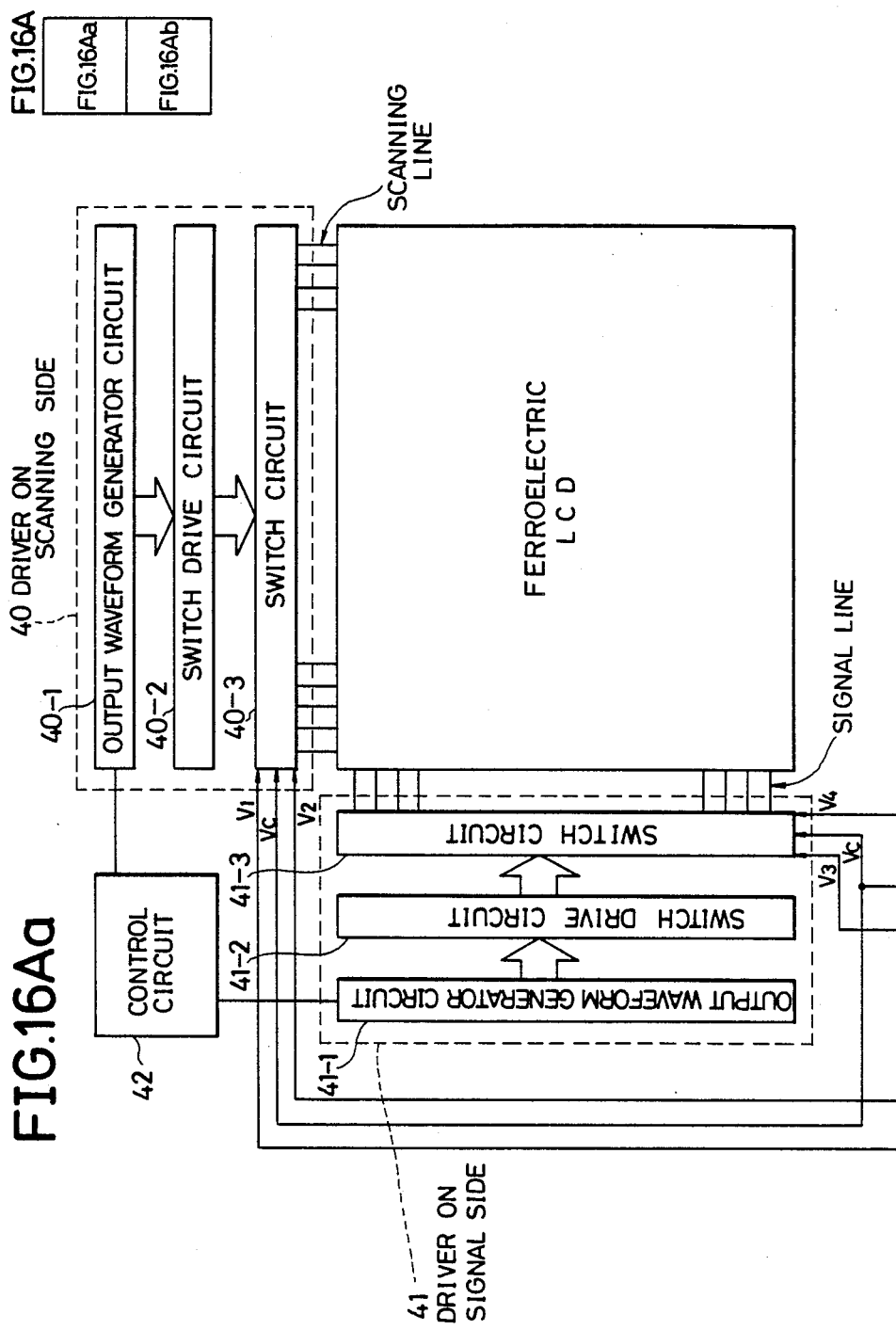
FIG. 16A is a block diagram of a circuit configuration for changing the voltage of a drive signal in accordance with temperature.
Figure 16A:
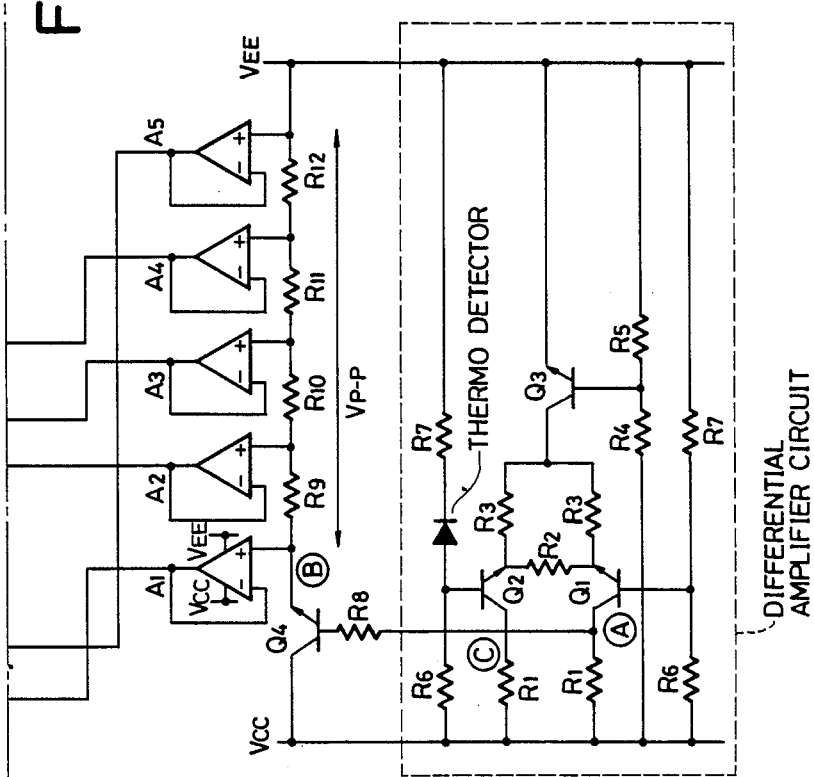

In the circuit shown in FIG. 16A, a diode is also used as a thermo detector Th as in the case shown in FIGS. 15A and 15B. In the circuit shown in FIG. 16A, a differential amplifier circuit 43 obtains the base potential of a transistor $Q_4$ (an adjuster for a voltage $V_{p-p}$ applied to comparators $A_1$ to $A_5$) utilizing the temperature characteristics of the diode as shown in FIG. 15C. The base potential is used as a $V_{p-p}$ adjustment signal for the transistor $Q_4$, and the display temperature change is converted into a drive pulse voltage.

Figure 16B:
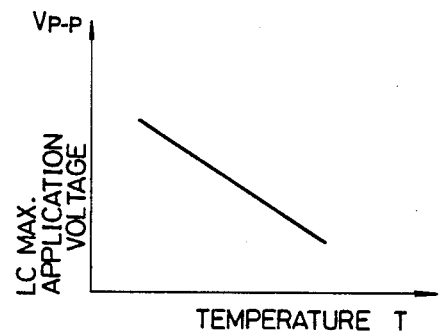
FIG. 16B is a graph showing the relationship between temperature T and LCD maximum application voltage $V_{p-p}$.

FIG. 16B shows the relationship between temperature T of the LCD 14 and $V_{p-p}$ (LCD maximum application voltage) thereof.

Referring to FIG. 16A, when the collector of the transistor $Q_4$ is grounded, the potential at point Ⓐ becomes substantially equal to that at point Ⓑ. The resistances of resistors $R_9$ to $R_{12}$ are set in a ratio of $R_9:R_{10}:R_{11}:R_{12}=1:1:1:1$ such that the ratio of $V_1$, $V_3$, $V_C$, $V_4$ and $V_2$ remains the same even if the voltage $V_{p-p}$ fluctuates. Voltages $V_1$, $V_3$, $C_C$, $V_4$ and $V_2$ set in this manner are supplied to operational amplifiers $A_1$ to $A_5$ constituting a voltage follower such that the voltages $V_1$, $V_C$ and $V_2$ are supplied to a switch circuit 40-3 of a driver 40 on the scanning side and the voltages $V_3$, $V_C$ and $V_4$ are supplied to a switch circuit 41-3 of a driver 41 on the signal side.

Figure 16C:
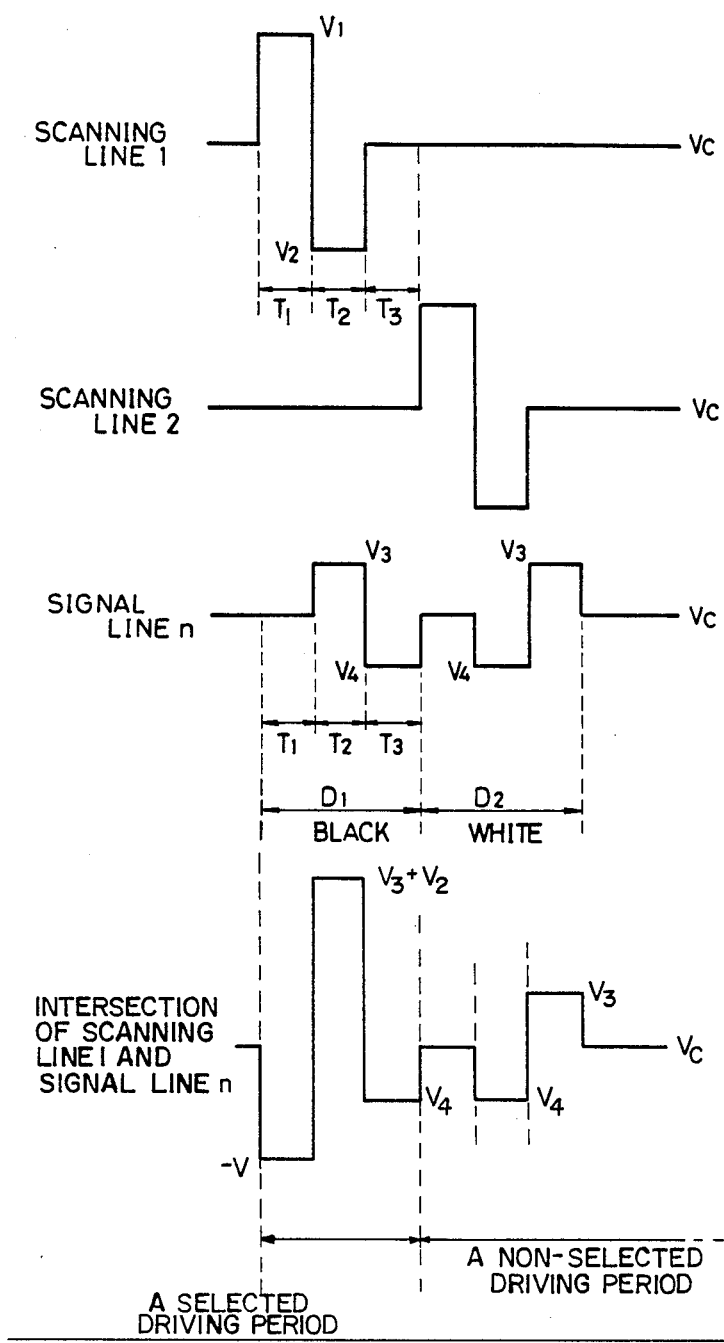
FIG. 16C is a timing chart for the circuit shown in FIG. 16A.

A control circuit 42 supplies a control signal to output waveform generator circuits 40-1 and 41-1 of the drivers 40 and 41 for obtaining drive signals of desired waveforms shown in FIG. 16C. In response to the control signal from the control circuit 42, the output waveform generator circuits 40-1 and 41-1 generate selection data of output potentials and supplies it to switch drive circuits 40-2 and 41-2. In response to the selection data, the switch drive circuits 40-2 and 41-2 drive switch circuits 40-3 and 41-3 to select switches. Then, a drive signal for a scanning line 1, 2, or n in FIG. 16C is output. The pulse widths of drive signals at times $t_1$, $t_2$ and $t_3$ are determined by clocks $\phi_A$, $\phi_B$ and $\phi_C$ described above with reference to FIGS. 11, 12 and 14 and are set to satisfy $t_1=t_2=t_3$ in this embodiment.

A differential amplifier circuit 43 shown in FIG. 16A operates in the same manner as the differential amplifier circuit 35 shown in FIG. 15B.

As described above, according to the present invention, the pulse widths or the voltages of the drive signal supplied to both the drivers on the scanning and signal sides can be changed in accordance with the temperature of the LCD. Compared with a case wherein the pulse width or voltage of a drive signal for only one of the drivers on the scanning and signal sides is changed, in this embodiment, the pulse widths, for example, of the drive signals for both the drivers are changed. This allows high-speed change of the pulse widths of the drive signals. In addition, when the voltages of the drive signals for both the drivers are changed, a large voltage difference due to temperature change can be compensated for at high speed, and control in accordance with the temperature of the LCD can be performed effectively.

The present invention is not limited to the above embodiments, and various changes and modifications can be made with reference to the accompanying drawings.

What is claimed is:
1. A display apparatus comprising:
a display element comprising a ferroelectric liquid crystal having a first and a second threshold value in accordance with the polarity of an applied voltage:
drive means for applying one polarity or another polarity voltage to said display element;
temperature detection means for detecting the temperature of said display element and outputting temperature data representative thereof; and
control means for (1) referring the temperature data to predetermined driving frequency data in accordance with a stored temperature, (2) extracting a designated one of the driving frequency data in accordance with a certain one of the temperature data, and (3) controlling said drive means so as to be able to apply one polarity or the other polarity voltage, exceeding the threshold value of the ferroelectric liquid crystal, to said display element at a selected driving period, and to apply a voltage between the first and the second threshold values of the ferroelectric liquid crystal to said display element at a non-selected driving period at a driv- ing frequency represented by the designated driving frequency data.

2. An apparatus according to claim 1, wherein said drive means drives said display element in accordance with the average temperature of said display element detected by said temperature detection means.

3. An apparatus according to claim 1, further comprising:
input means for inputting data; and
pattern generating means for generating a pattern corresponding to data input from said input means, said drive means allowing a pattern corresponding to the data to be displayed by said display element.

4. An apparatus according to claim 3, wherein said input means comprises a plurality of key input switches, and said pattern generating means comprises a character generator for transforming character code data input by said key input switches into image data.

5. An apparatus according to claim 4, further comprising a character memory for storing character code data input at said input means, and wherein said drive means reads out the character code data from said character memory and transforms the character code data into image data by said character generator.

6. An apparatus according to claim 1, wherein said drive means comprises scanning signal output means for outputting a scanning signal for scanning said display element, signal output means for outputting a data signal to said display element, and setting means for setting the pulse widths of the scanning and data signals in accordance with an output from said temperature detection means.

7. A display apparatus comprising:
a display element comprising a ferroelectric liquid crystal having a first and a second threshold value in accordance with the polarity of an applied voltage;
drive means for applying one polarity or an other polarity voltage to said display element;
a plurality of temperature detection means each for detecting the temperature of said display element and outputting temperature data representative thereof; and
control means for (1) calculating an average temperature of said display element from the plurality of temperature data, (2) referring the average temperature to predetermined driving frequency data in accordance with a stored temperature, (3) extracting a designated one of the driving frequency data in accordance with a certain one of the temperature data, and (4) controlling said drive means so as to be able to apply one polarity or the other polarity voltage, exceeding the threshold value of the ferroelectric liquid crystal, to said display element at a selected driving period, and to apply a voltage between the first and second threshold values of the ferroelectric liquid crystal to said display element at a non-selected driving period at a driving frequency represented by the designated driving frequency data.

8. An apparatus according to claim 7, wherein said plurality of display elements are divided into a plurality of blocks, and said temperature detection means detects the average temperature for each of said plurality of blocks.

9. An apparatus according to claim 8, wherein said control means discriminates a block to which a display element to be driven among said plurality of display elements belongs, and outputs a drive signal having a pulse width corresponding to the average temperature of the block to which the display element to be driven belongs.

10. An apparatus according to claim 7, further comprising:
input means for inputting data; and
pattern generating means for generating a pattern corresponding to data input from said input means, said control means allowing a pattern corresponding to the data to be displayed on said display elements.

11. An apparatus according to claim 10, wherein said input means comprises a plurality of key input switches, and said pattern generating means comprises a character generator for transforming character code data input by said key input switches into image data.

12. An apparatus according to claim 11, further comprising a character memory for storing character code data input at said input means, and wherein said control means reads out the character code data from said character memory and transforms the character code data into image data by said character generator.

13. An apparatus according to claim 7, wherein said control means comprises scanning signal output means for outputting a scanning signal for scanning said plurality of display elements, signal output means for outputting a data signal to said plurality of display elements, and setting means for setting the pulse widths of the scanning and data signals in accordance with an output from said temperature detection means.

14. A display apparatus comprising:
display means comprising a ferroelectric liquid crystal assuming a first and a second threshold value in accordance with the polarity of an applied voltage, a set of scanning electrodes and a set of data electrodes, thereby defining a plurality of display elements intersecting the set of scanning electrodes and the set of data electrodes;
drive means for applying a scanning signal in serial to the set of scanning electrodes, and applying data signals in parallel to the set of data electrodes;
temperature detection means for detecting the temperature of said display means and outputting temperature data representative thereof;
scanning means for outputting a scanning signal having a predetermined pulse width to scan said display means;
signal output means for outputting a data signal having a predetermined pulse width to said display means; and
control means for (1) referring the temperature data to predetermined pulse width data in accordance with a stored temperature, (2) extracting a designated one of the pulse width data in accordance with a certain one of the temperature data, and (3) controlling said scanning means and said signal output means so as to output the scanning signal having the designated pulse width and the data signal having the designated pulse width.

15. An apparatus according to claim 14, wherein said control means causes said scanning means and said signal outputting means to output the scanning signal and the data signal, respectively, having pulse widths in accordance with the output from said detecting means.

16. An apparatus according to claim 14, wherein said control means causes the scanning and data signals to have different amplitudes in accordance with the output from said detecting means.

17. An apparatus according to claim 14, wherein the scanning and data signals are three-value signals respectively.

18. A display apparatus comprising:
a display panel comprising a ferroelectric liquid crystal assuming a first and a second threshold value in accordance with the polarity of an applied voltage, a set of scanning electrodes and a set of data electrodes, thereby to define a plurality of display elements intersecting the set of scanning electrodes and the set of data electrodes;
drive means for applying a scanning signal in serial to the set of scanning electrodes, and applying data signals in parallel to the set of data electrodes;
temperature detection means for detecting the temperature of said display panel;
control means to control the drive means so as to produce a picture on the display panel, to decrease the maximum of the applied voltage to the display element, and to apply a voltage exceeding the threshold value of the ferroelectric liquid crystal to a display element on a selected scanning electrode, and to apply a voltage between the first and the second threshold values of the ferroelectric liquid crystal to a display element on a nonselected scanning electrode.

19. A display apparatus comprising:
display means comprising a ferroelectric liquid crystal assuming a first and a second threshold value in accordance with the polarity of an applied voltage, a set of scanning electrodes and a set of data electrodes, thereby defining a plurality of display elements intersecting the set of scanning electrodes and the set of data electrodes;
temperature detection means for detecting the temperature of said display means and outputting temperature data representing the same;
scanning means for outputting a scanning signal having a predetermined peak value of the voltage to scan said display means;
signal output means for outputting a data signal having a predetermined peak value of the voltage to said display means; and
control means for (1) referring the temperature data to predetermined peak value data in accordance with a stored temperature, (2) extracting a designated one of the peak value data in accordance with a certain one of the temperature data, and (3) controlling said scanning means and said signal output means so as to output the scanning signal having the designated peak value of the voltage and the data signal having the designated peak value of the voltage.

* * * * *